United States Patent [19]

Umstattd

[11] 3,800,129

[45] Mar. 26, 1974

[54] MOS DESK CALCULATOR

[75] Inventor: Richard H. Umstattd, Canoga Park, Calif.

[73] Assignee: Electronic Arrays, Inc., Woodland Hills, Calif.

[22] Filed: Dec. 28, 1970

[21] Appl. No.: 101,769

[52] U.S. Cl. .......... 235/156, 235/160

[51] Int. Cl. .......... G06f 7/38

[58] Field of Search .......... 235/152, 156, 159, 160, 235/92 ME, 92 DE; 340/172.5, 365

[56] References Cited

UNITED STATES PATENTS

| | | | |
|---|---|---|---|
| 3,308,280 | 3/1967 | Crowther et al. | 235/160 |
| 3,509,331 | 4/1970 | Cutaia | 235/159 X |
| 3,469,242 | 9/1969 | Eachus et al. | 340/365 |
| 3,579,192 | 5/1971 | Rasche et al. | 340/172.5 |
| 3,280,315 | 10/1966 | Kitz | 235/156 X |
| 3,353,008 | 11/1967 | Kitz et al. | 235/156 X |
| 3,560,933 | 2/1971 | Schwartz | 340/172.5 |
| 3,487,369 | 12/1969 | King et al. | 340/172.5 |
| 3,483,553 | 12/1969 | Blankenbaker | 340/365 |

*Primary Examiner*—Felix D. Gruber
*Assistant Examiner*—James F. Gottman
*Attorney, Agent, or Firm*—Smyth, Roston & Pavitt

[57] ABSTRACT

A 5-MOS chip desk calculator wth input switching matrix which is periodically interrogated for inputting, and display control for outputting. The chips are designed for minimum interchip connection. Information is inputted via a keyboard and switching matrix, which is continuously interrogated by a recycling counting process. Number ranges are used to distinguish between command entries and digit entries. Entered arithmetic commands are executed after entry of the next command, figures are stored as entered. Special provisions are made for decimal point setting and entry.

19 Claims, 10 Drawing Figures

Figure 1:
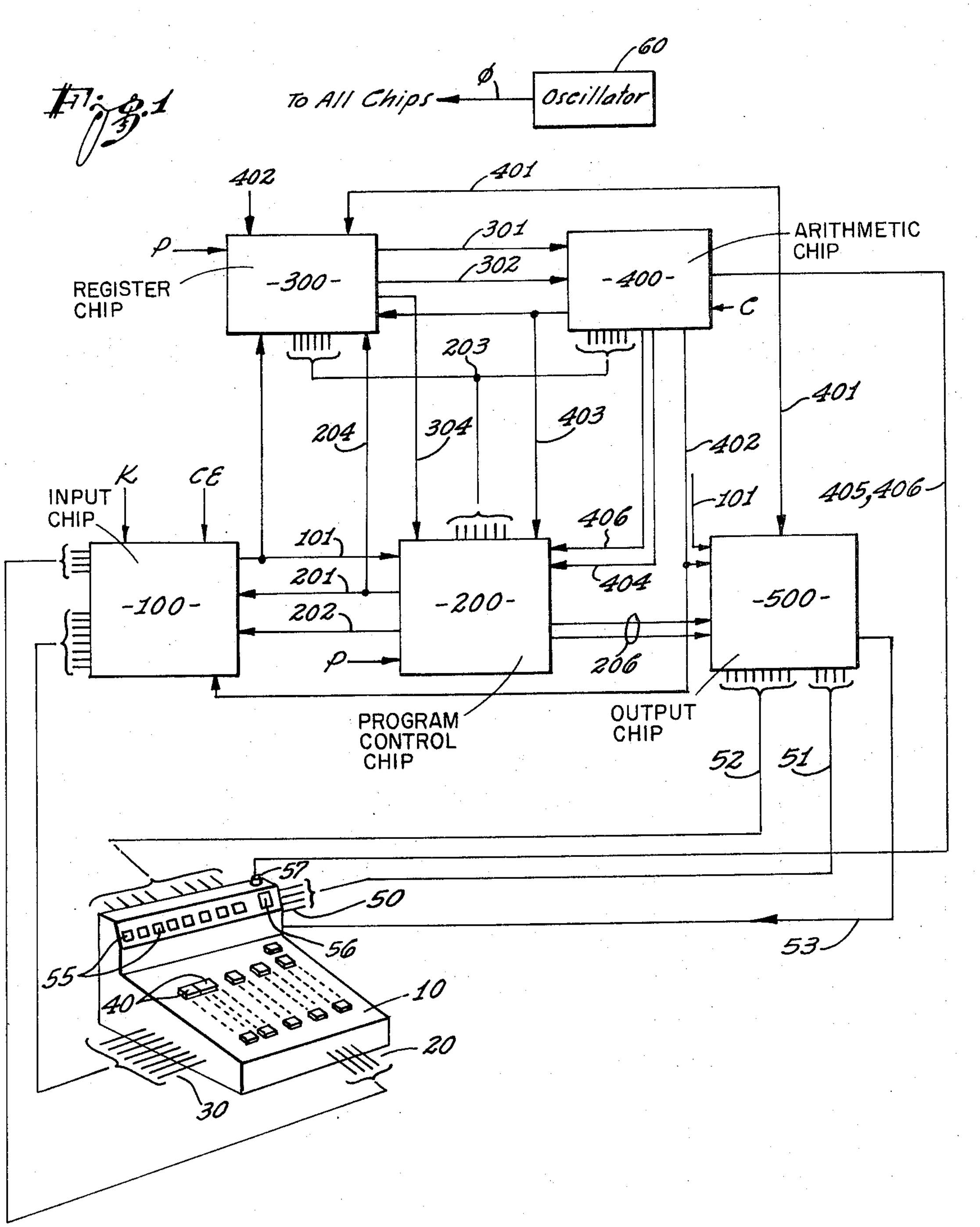

INVENTOR:
Richard H. Umstattd
By Smyth, Roston & Pavitt
Ralf H. Siegemund
ATTORNEYS INVENTOR:
Richard H. Umstattd
Smyth, Roston & Pavitt
By Ralf H. Siegemund
ATTORNEYS INVENTOR:
Richard H. Umstattd
Smyth, Roston & Pavitt
By Ralf. H. Siegemund
ATTORNEYS INVENTOR:
Richard H. Umstattd
Smyth, Roston & Pavitt
By Ralph H. Siegemund
ATTORNEYS INVENTOR:
Richard H. Umstattd
Smyth, Roston & Pavitt
By Ralf H. Siegemund
ATTORNEYS

MOS DESK CALCULATOR

The present invention relates to a novel construction for a desk calculator, designed to minimize wiring and to maximize use of integrated circuitry.

It is an object of the invention to improve packaging of circuitry involved and used for desk calculator, so that all of the operating circuitry is included in a few large scale integrated circuit chips. It is another object of the present invention to include circuit connections for a desk calculator in a plurality of large scale, integrated circuit chips organized as to content for minimizing the need for interconnection.

It is another object of the present invention to provide a new input system for inputting of information in a desk calculator.

In accordance with the invention, the desk calculator includes an integrated circuit input chip connected to a switching matrix established by an array of interrogation and sense lines. The interrogation lines define matrix columns, the sense lines define the rows of the matrix. Entry switch keys are disposed on the intersections, so that upon pressing a key an interrogation line is connected directly to a sense line. The input chip includes a scan counter that periodically provides interrogation pulses into the lines of the columns for passage through a closed switch into one of the sense lines. Reception of such a pulse by the input chip halts the scan counter, and the counter state represents the switch that was closed. In case the switch, that was found closed, represents a figure (one of the ten decimal digits 0 to 9), one of two different codes are produced first for transmission. The two codes distinguish between integer and fraction digits. In case the switch represents a command, the count state of the scan counter is directly interpreted as an addressing code, i.e., the code is to serve for a particular entry in a microprogram.

The circuitry of the desk calculator is now organized to have a program chip which is a read-only memory for storing plurality of microprograms. That chip is connected to the input chip to interpret either of these codes as addressing codes for a particular microprogram. In case of the figure codes, a figure loading program is begun according to which the value of the figure key pressed is serially loaded into a register, contained in a third chip. Sequential figures entered cause them to be accumulated (concatenated) in the input register. The value of a figure entered is defined by the specific state of the scan counter upon halting.

For each command a specific microprogram is executed pursuant to which arithmetic operations are carried out. For this, an arithmetic chip is provided holding circuitry to arithmetically combine digit strings supplied by the register chip. Entered digit strings and results are periodically set into an output chip which controls display of either by an external multi-digit display device.

As far as interconnection is concerned, input and output chips have plural lines; the former for connection to the input matrix, the latter for display position and digit display presentation control. Plural lines for parallel operation connect also the control chip to the register and to the arithmetic chips.

In addition thereto, only a few timing and control lines, as well as serial data transfer lines, interconnect the several chips, to minimize external connection for each of them. All chips are operated by a common clock; one chip contains a master timing circuit to synchronize all operations to the cycle rate of the principle registers.

For larger programs several program control chips may be needed. Also, additional register chips as storage extension may be required for more extensive data storage. On the other hand a more limited format and/or more limited arithmetic capabilities may permit employment of fewer chips.

In essence, each chip is of the MOS variety and is comprised of particular bit storage stages serving as registers, counters and control flip-flops, possibly interchangeably, and occupying one or opposite sides of a chip. These stages are interconnected and loaded by a particular gating matrix and array structure, occupying the other side or the center thereof.

Figure 1A:
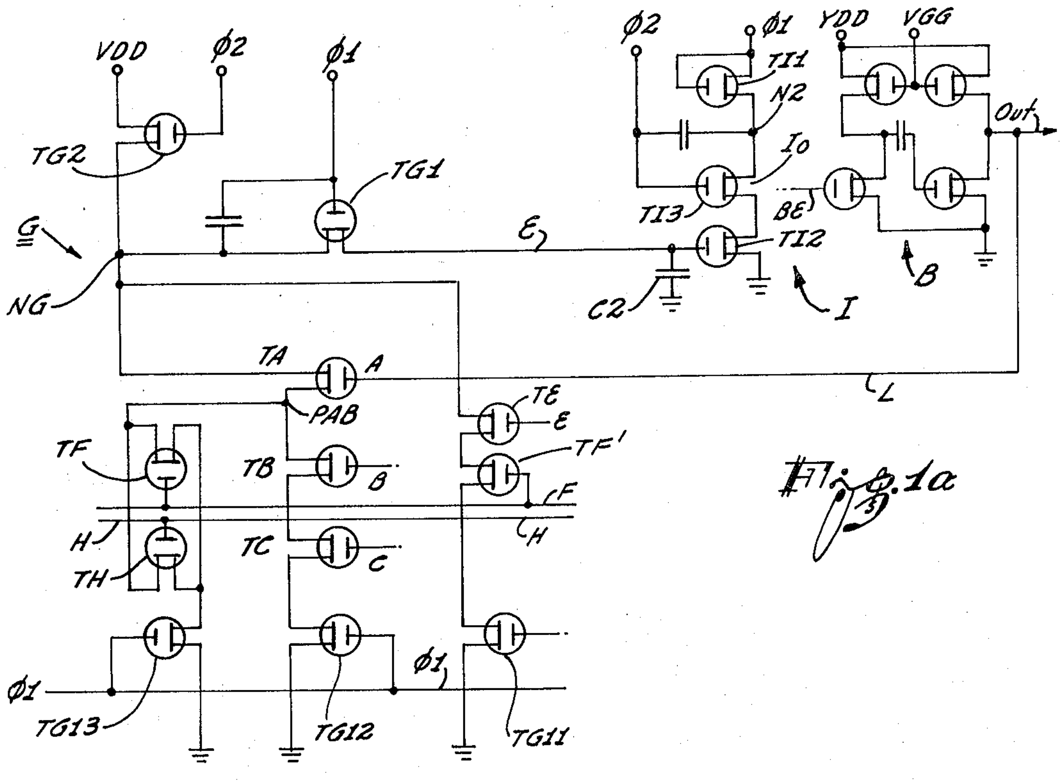
Figure 1A:
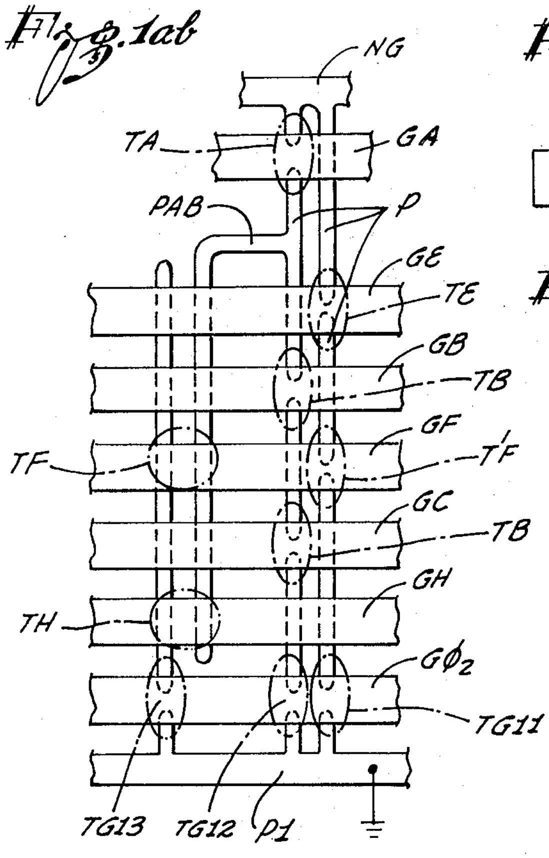
Figure 1A:
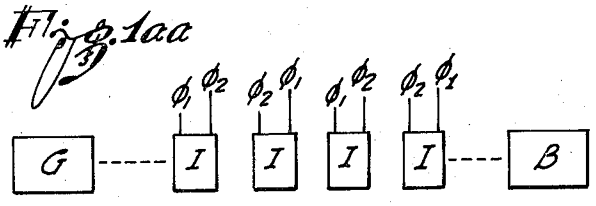
Figure 1A:
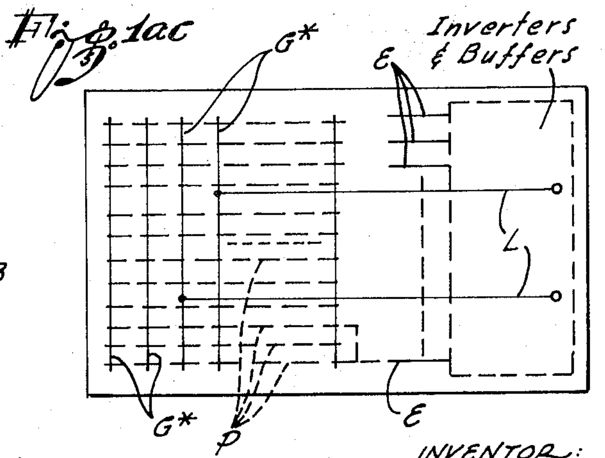
Figure 2:
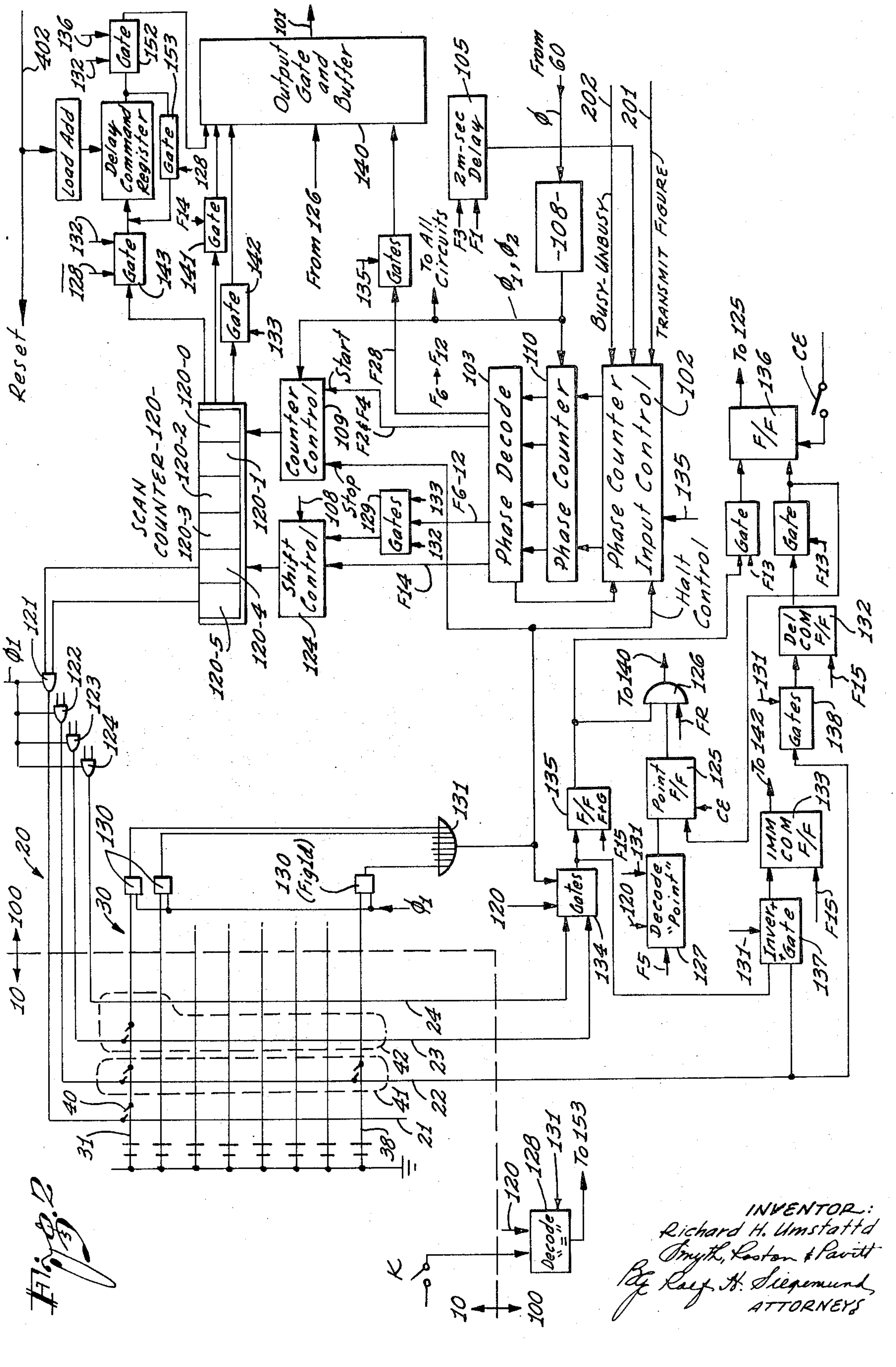
Figure 3:
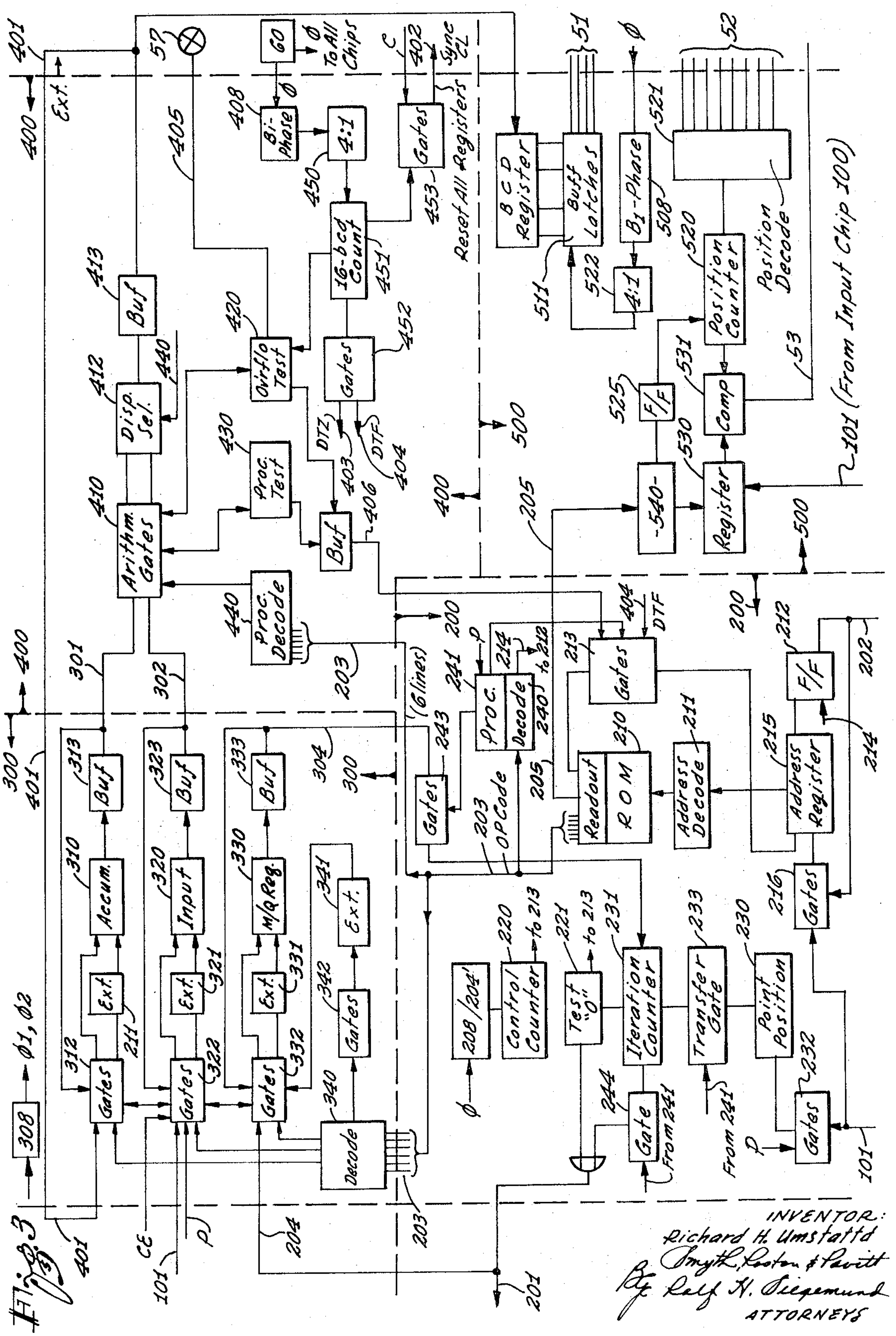

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 illustrates an overall layout of a five integrated circuit chip, desk calculator with input, switching matrix and output display;

FIGS. 1*a*, 1*aa*, 1*ab*, 1*ac*, 1*b*, 1*c* and 1*d*, illustrate circuit diagrams for component structure;

FIG. 2 illustrates a block diagram for the input chip and input switching matrix; and FIG. 3 illustrates a block diagram of control, register, arithmetic and control chips.

OVERALL LAYOUT

Proceeding now to the detailed description of the drawing, in FIG. 1 thereof is illustrated the general layout of the desk calculator in accordance with the preferred embodiment of the present invention. The desk calculator is comprised of five large scale, integrated circuit chips 100, 200, 300, 400 and 500, each having 24 pins (that number is not critical, but represents approximately a practical upper limit). Each chip is of the MOS type using insulated gate, field effect transistors as active elements. The basic construction principles for each chip will be disclosed with reference to FIGS. 1*a* et seq.

The calculator includes, further, an input section 10 and an output section 50 in a common cabinet, holding also the rather small MOS chips. As schematically indicated, the input section includes a plurality of switches such as 40, provided to operate a switching matrix for input keying of information. The switching matrix includes eight sense-rows 30 and four energizing or interrogating columns 20 to establish which of the keys have been pressed. (Rows and columns do not lead outside of the cabinet, and are only shown schematically and as linked to the five chips.) The keys represent figures and commands to be entered respectively upon pressing such a key.

The input section includes four additional switches called C, CE, P and K, which do not pertain to the switching matrix, as they establish operating conditions asynchronously to the operation of inputting information via any of the keys of the switching matrix. Particularly, the effect of pressing one of the keys C, CE, P and K has to last for longer duration than individual input keying.

Briefly, switch C is provided to clear and erase the entire stored information content of the calculator. Switch CE is to clear entry of the preceding figure. Switch P remains pressed to indicate that the next figure or figures entered define the relative position of the decimal point within a multi-digit format and do not constitute information proper. Key K denotes that a previously entered multiplier or divisor is to be saved for use as operand in the next arithmetic operation as keyed-in.

The output section 50 includes digit display means, such as eight "nixie" tubes 55 each capable of displaying the digits "0" to "9." The output section operates in response to bcd signals on four digit lines 51. A decoder 56 determines which digit is to be displayed by any of the display tubes. Decoder 50 is of the "bcd-to-one-out-of-ten" variety. Which one of the eight nixie tubes is to be activated is determined in response to activation of one out of a plurality of eight digit position select lines 52; a select signal accompanies each group of bcd signals in lines 51.

Aside from permitting display of ten different figures, each nixie tube has to display a decimal point in immediate association with the respective figures. A control signal in a line 53 accompanies the particular position control figure if the particular decimal point is to be displayed.

Each tube is activated on a cyclic basic, whereby the repetition cycle rate for each select position is well above the visible flicker frequency, so that all digits to be displayed (one per nixie tube) appear as being displaying continuously. The plural nixie tube display control is conventional and not part of the invention except for completion of the calculator to present a useful output.

The five chips include the operating and signal processing circuitry of the desk calculator. They include an input chip 100, a program control chip 200, a register chip 300, an arithmetic chip 400 and an output chip 500. The division has been chosen to minimize connection between the chips. This requires each chip to have a great degree of autonomy and to entertain only limited communication with other chips.

The input chip is connected to the rows 30 and columns 20 of the switching matrix system to interrogate the state of the figure and command input keys and to interpret the result of the interrogation. For this, interrogating signals are periodically furnished into the columns, 20, one at a time, and any return of that signal though one of the rows 30 is continuously probed in chip 100. Data may flow via a line 101 to the register chip, the program chip and (in a very limited extent) to the output chip. It is up to each of these three chips to accept or to reject the data flow.

Two control lines, 201 and 202, provide control information from program chip 200 to input chip 100. The program chip determines when the input chip is permitted to interrogate the switching matrix (un-busy signal in line 202) and when it may transmit data via line 101 (transmit central via line 201). There is no further connection necessary between the input chip and any of the other chips.

Program chip 200 holds a ready-only memory as principle program control and control sequencing device. For this reason, this chip will also be called ROM-chip 200. Six lines 203 provide the same operate codes from chip 200 to register chip 300, as well as to arithmetic switch 400, as to control a variety of data communication between them, particularly for arithmetic processing of data, and/or for transfer to the output chip.

Data inputted and processed are stored in the registers of chip 300 until erased or replaced. Data lines 301 and 302 feed data from two of the three registers included in chip 300 to the arithmetic unit for processing. The result of processing is fed back via a return line 401, leading also to output chip 500 for concurrent control of display of these data.

Quotients and multipliers circulate through the system via line 304 from the register chip to control chip 200 and from there via line 204 (sharing line 201) to the register chip. Test signals pass from the arithmetic chip via line 404 for program branching and program loop exiting.

One of the chips has to hold circuitry for synchronizing timing. The arithmetic unit was found convenient and provides the following timing signals: The "clear" signal is applied to chip 400 in that the key C connects directly to that chip. As a consequence, a synchronized clear signal is transmitted to all other chips via line 402, to synchronize all registers to the same phase. Digit time zero (or DTZ for short) is a pulse train, provided at a repetition rate equal to the normal register cycle rate. Line 403 transmits that signal to register chip 300 as well as to program chip 200, to provide control synchronous to register circulation therein. Each signal DTZ is preceded by an end of cycle or Digit-Time-Fifteen (DTF for short) signal, passed to the program chip only, to synchronize program advance therein (line 406).

Aside from the foregoing, the P-switch is connected to register and program chips, to identify a figure entry as decimal point position number and to inhibit interpretation as data. The clear entry switch CE connects to chips 100 and 300. The K-switch affects directly the input chip only, causing temporary storage of a command therein to be extended.

The output unit 50 is primarily under control of the output chip which converts the serial bcd data flow from the arithmetic chip into a parallel presentation, properly timed for display control. There is also a sign bit to be displayed. As further output processing of that bit is not needed, the sign bit is directly derived from the arithmetic unit (line 406) and fed to the display console. The same is true for a detected overflow (line 405) controlling an indicator lamp 57. Output chip 500 receives signals via two program lines 206 from the ROM chip 200. Other connections of the output chip have already been discussed.

The system is operated by a clock 60 providing clocking signals $\phi$ to each chip. Block 60 is a regular conventional oscillator. Each chip receives the clocking signals and converts into a bi-phase clock. The converting circuitry is depicted representatively in FIG. 1d. Aside from these signals each chip receives the power and potential supplies ground, VDD and VGG, not illustrated in FIG. 1 but in others.

COMPONENTS

FIG. 1*a* illustrates structure realized in the lay-out of each of the individual MOS-chips. In essence, such a chip includes bit storage stages and input gating for loading bits into the bit storage stages. The output of such a first bit storage stage is either cascaded in series with others to obtain a shift register, or the output is fed back directly into the gating structure to obtain single bit storage. Plural single bit stages can be interconnected through appropriate input and output gating and coupling to establish counters. The output of the shift register may also be fed back to the gating structure of the input stage to obtain recirculation and/or such output is fed to buffer structure to serve as an output to be extracted from the chip.

Figure 1B:
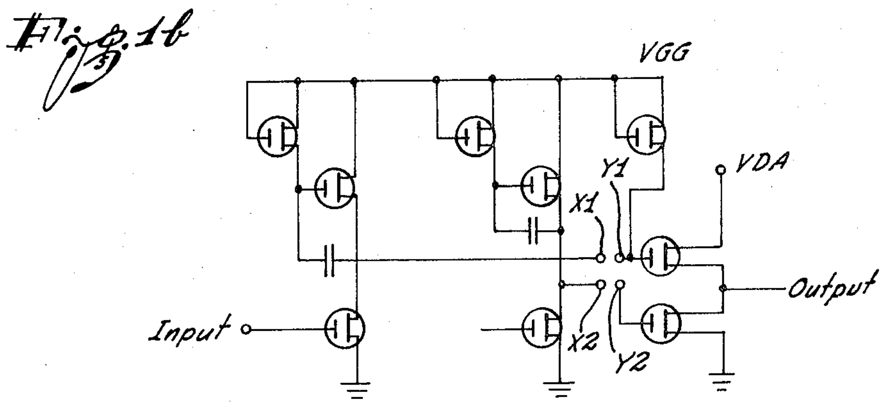

A typical single bit storage stage with input gating and serial expansion capability is illustrated in FIG. 1*a*. The stage is comprised of an inverter I, and of input gating structure G of particular design, interconnected by line E. The combination G-I is subject to a separate patent application of one R. Fruin of common assignee. The output of inverter I connects either directly to a buffer BU whose output is fed back into the gating structure G, or there are additional stages I interposed as shown in FIG. 1*aa*, whereby each two cascaded inverters are clocked in phase opposition to establish a single bit storage stage. The last inverter is connected to a buffer BU. The output of such buffer BU is either extracted, or fed back to the input gating G, or both. An alternative buffer is shown in FIG. 1*b*.

Turning now to details of inverter stage I, such as disclosed more fully and claimed in copending application of common assignee SN 7,769 filed Feb. 2, 1970. Briefly, such an inverter stage includes an MOS-transistor TI 1 connected to the operated by and in synchronism with, for example, phase pulse or signal $\phi$ 1, thereby charging a node N1. A so-called Tri-FET TI 3, disclosed also in said application SN 7,769 and also in application Ser. No. 7,767, filed Feb. 2, 1970, has its gate operated in synchronism with the opposite phase signal $\phi$2. One main electrode of TI 3 is connected to node N1, the second main electrode, denoted IO, serves as output, and the third main electrode connects via an input signal operated transistor TI 2 to ground. The gate of TI 2 connects to and is part of internal terminal or connector E.

Capacitor CI is provided to increase the charge of node N1 in case that node is not discharged on $\phi$2 to ground. The node N1 shares its charge with any node connected to output terminal IO of stage I. A capacitor C 2 between the gate of T 12 and ground is needed, as the capacitance of the gating structure G is high, so that enough charge is made available to control transistor TI 2. Capacitor C 2 will be developed as gate overlap with the grounded source electrode of TI 2

At phase time $\phi$1, node N1 is charged. If at the next pulse $\phi$2 the signal on E is negative, node N1 discharges through conductive Tri-FET TI 3 and transistor TI 2, so that the inverted signal, about ground potential, can be taken from the output electrode IO of the Tri-FET. If at a pulse $\phi$2, the signal on E is about ground, node N 7 is not discharged, but the charge is shared with the node on IO.

In case of a shift register type operation, bits pass inverter stages that are similarly constructed but operated at alternating phases. This is representatively shown in FIG. 1*aa*, showing that any two inverters connected in immediate sequence are operated at alternate phases as to phase signals $\phi$1 and $\phi$2. Each two stages store a bit (upon inverting same twice) for a full clock period $\phi$1 → $\phi$1. The input gating structure G, plus one inverter directly connected thereto, does the same as will be shown below.

One of the inverters so connected will provide an output to input terminal BE of buffer B, gated-on by voltage VDD and VGG and providing a boosted output signal OUT. For a single bit storage, terminal 10 in FIG. 1*a* would be connected directly to input terminal BE of the buffer BU.

The transistors of inverter I and others of similar type (FET), are of minimum size, i.e., serially connected transistors do not require a particular impedance ratio when conductive because at no time is there a conductive path between an input voltage line ($\phi$1 or $\phi$2) and ground. Only the particular output buffers require impedance ratio transistor configuration; they are operated at the same input voltage, VDD, which is the supply voltage for the system generally; additionally, a higher gating voltage VGG is used for such a buffer to drive the transistors thereof well into saturation.

In summary then, a plurality of such particular inverters are provided on an IC chip of the MOS variety as input stages, so that there are a plurality of input terminals such as E. These input terminals are under control of an overall gating structure on the chip of which gating structure G is a part. The topological layout of such a chip is shown schematically in FIG. 1ac.

The block drawn in phantom lines and to the right holds the several inverters of the chip, or at least most of them, in a (physical) parallel configuration, along the right hand margin. The block holds also the buffers of the system. If space requires, the area occupied by the inverters and buffers may be extended back, partially along lower and upper edges of the chip, or opposite edges can be so occupied by such elements. The inverters, individually or cascaded, with an input inverter as described, are controlled through input lines E which are constructed partially as P-zones (in an N-type substrate), partially as plated strips leading to the input gates (transistor T 12 and others of similar function) of the several inverters.

The overall gating structure is comprised of P-doped columns P (dotted lines, having predominant extension in one direction, horizontally in the Figure), but they are not uninterrupted, as gaps are needed to establish conduction channels for field effect operation. The ends of the columns are interconnected by transversely extending short zones that provide merger for selective connection to lines E which link the gating structure with the inverters.

Transverse to the P-columns, there extend transistor gating structure defined by plated strips and establishing the gating line system G* crossing the P-zone (or the P-zone gaps). The G*-P system establishes the gating matrix proper for the entire chip. The lines of system G* are connected at selected points to P-zones to extract therefrom the gating signals. Particular P-zones (L) provide data feedback and circulation. Input terminals of the chip, usually along the edges lead to P-zones. In case the chip holds many inverters of which only a few are cascaded, they may be arranged along opposite sides of the chip. An input line E, as it extends from the gating matrix, can be coupled to inverters to the left as well as to the right ends of the P-zones.

The gating structure G which provides the particular input signal for an input terminal E as representatively depicted in FIG. 1*a* is, thus, a portion of the P-G* gating matrix on a chip. Gating system G is particularly constructed as follows.

There is a phase gating portion comprised of the transistors TG1 and TG2. The drain-so-source path of transistor TG1 connects a principal node NG of the particular gating configuration that is operative for applying an input signal to the terminal E, to that line E. Transistor TG1 is rendered conductive by and in synchronism with the phase pulse $\phi$1. Therefore, the charge content of node NG is applied to the gating terminal of transistor T12 of inverter I, at pulse time $\phi$1.

The node NG is precharged by and in response to the phase signal $\phi$2 via transistor TG2 connected with its drain-to-source path between the source voltage VDD (it could be $\phi$2) and the node NG. By and during phase time $\phi$1 node NG is or is not discharged, by the remainder of the gating structure so that either charge or ground potential becomes effective at the input E. The selective discharge control for node NG is established as follows.

In essence, there is a lattice type structure in the MOS chip in which, e.g., in an N-type substrate, elongated P-zones are arranged in columns along a first direction and parallel to each other. A gap in between two colinear zone runs on the same column establishes a drain-to-source path for a transistor. The several gaps along the same column establish serially connected drain-to-source paths for FET's. A transistor of the insulated gate type is established by a gate plating such as GB, GC, G$\phi$1 and others. These gates are plating strips across the chip; they extend parallel to each other as stated and transverse to the P-zone columns. These rows of gates pertain to the set G* needed on the chip for all of the gating signals thereon to control the various inputs E for the various storage facilities on the chip.

Take, for example, one of the column which is illustrated in FIG. 1ab of the drawing and which includes a transistor TA established underneath a gate strip plating GA and having its drain-to-source connected in series with a transistor TB, which, in turn, is connected serially with a transistor TC. This series connection of transistors TA, TB and TC, establishes the logic AND function for input signals applied to the respective gates GA, GB, GC, called signals A, B and C respectively. As stated, the gates as established by plating, extend transversely to the column arrangement; therefore, they can be used to apply the respective gating signals to more than one transistor in different columns and pertaining either to the same gating structure G, and/or to a different one within system G* on the same chip and operating a different input inverter as pertaining to different flip-flop or register.

As stated, these gating signals are developed either externally or internally which means that, for example, the signal OUT may be identical with the signal A, in which case transistor TA controls recirculation of a particular bit. Line L will be in parts a P-column, joined to a gate plating, e.g., GA. Thus, the output terminal of the particular buffer BU is coupled to the gate strip GA, either in a single stage flip-flop type arrangement or in a plural shift register type arrangement, etc.

The signals B and C then determine under which circumstances, in fact, there is to be recirculation or not. I.e., the logic AND function B·C=1 must be true in order to establish such recirculation. Absence of that AND realization will result in setting new information into that particular stage I rather than providing recirculation of the same inverter chain.

Each of the columns includes at one end a transistor such as TG 11, TG 12, TG 13 established by a channel defining gap in the column of P-zones, and by the same gate plating that receives phase signal $\phi$1. The P-zone ends of all these transistors, TG 11, TG 12, etc. on the respective column ends and which define the respective source electrodes merge (zone P 1) and are connected to substrate potential (ground). As the other end of a column, e.g., the drain electrode of transistor TA is shown as connected to node NG, that node will discharge upon $\phi$1 when all signals A. B. C are true (negative potential!).

It should be noted that the buffer BU provides a particular output extracted from the preceding inverter at the same time $\phi$1. In case the illustrated buffer BU has its input BE connected directly to the output electrode 10 of inverter I (establishing a node therewith), a single flip-flop type stage is more established and is recirculated as long as B=C =1. Thus, the particular position of gating structure G along that column holding transistor TA, together with inverter I provides a single bit storage facility.

Alternative inputs for selective discharge or discharge inhibition of node NG are now provided as follows. There are other transistors TE and TF connected in series to each other, along another column and receiving gating signals E and F via gate platings GE and GF respectively. The series connection of the transistors TE and TF establishes AND function for signals E and F. The phasing transistor TG 11 connects serially to that column, receiving also the gating signal $\phi$1. Both chaines of transistors, TA, TB and TC, on one hand and TE, TF on the other hand, connect directly to the same node NG, so that the OR function is realized thereby direct merger of the respective P-zone ends at the node NG, i.e., the charge state of the node at phase $\phi$1 is determined by the logic function: (A · B · C+E · F) · $\phi$1. Additional columns can be connected in that manner between node NG and ground, each gated upon $\phi$1, each capable of discharging node NG in OR function operation.

The columns as pertaining to gating structure G are connected separately to ground via a $\phi$1-gated transistor, but not necessarily directly to node NG. Instead, a column may connect to an intermediate point, for example, the one that connects to point PAB between transistor TA and TB. This way, the OR-function is separately realized on that point. Decisive is thereby, that an alternative path to ground can be established from point PAB. There are shown additional transistors TF and TH (and possibly others) established by two separate parallel running P-zone columns. The two transistors are connected in parallel to each other (to obtain OR-function of signals F and G). Both transistors are connected in series with phase $\phi$1 gating transistor TG 13. The two P-zone columns are functionally similar to two columns, each with a serial gap, and each being separately $\phi$1-gated, except that it is topoligically more practical to provide transistor defining gap space between two parallel running P-zones crossed over by gating strips GF and GH (and others) for multiple OR-function. Usually there are more than two signals to be or'd. One will chose this configuration when additional "and" gating of the individual signals to be or'd is not required.

All these connections are, of course, representative examples of the matrix structure of the gating configuration as extending between the principle control node NG for the one input inverter and ground with each column separately governed by $\phi 1$. One can, therefore, see that the large structure on a principle node, such as NG, is composed of these elements: There are columns which are interrupted by channel defining gaps covered over by gate platings to establish FET type transistors and connected in an and-function establishing configuration along the column. Plural columns directly interconnected, for example through transversely extending P-zone sections are Or-gated therewith. Pairs of columns establish the possibility of plural, parallel channel defining gaps and can be covered over by plural gate platings to establish multiple or-function transistors. Any column or string of columns, directly or through sharing with others, connects between the node NG and ground, but each such connection leads through $\phi 1$ controlled transistor, as selective discharge of the node is the principal operation of the gating structure.

The particular connection requires transistors of minimum size only. Here as before, minimum size refers to minimum MOS-channel length, e.g., the gap between colinear P-zones on a column, or between parallel columns for immediate or-gating, to obtain, for example, definite enhancement node operation. Whenever, through any of the columns as directly or indirectly connected between node NG and ground, all transistors on a column are rendered conductive at phase time $\phi 1$, node NG will be discharged, and the input signal for the stage I is accordingly ground potential and processed further in accordance with operation of whatever circuit connects to inverter I. Node NG is charged via transistor TG 2 upon signal $\phi 2$. During $\phi 2$ none of the columns can possibly be conductive due to $\phi 1$ gating. Thus, there never is any conductive path between VDD and ground, and all transistors can be of minimum size.

If none of the columns, directly or indirectly, provides a discharge path during $\phi 1$, node NG having been charged during and by phase signals $\phi 2$ retains its charge and that charge becomes effective as control signal for rendering for transistor T12 conductive, so as to obtain complementary operation and further processing.

FIG. 1*b* illustrates a different type buffer that can be used also to extract signals from a chip for use in other chips, and providing comparatively high fan-out capability. The junctions X1, X2 can be connected to junctions Y1, Y2, in the configuration X1 → Y1, X2 → Y2, or in the configuration X1 → Y2, X2 → Y2 depending upon whether or not additional signal inversion is required. Usually, a buffer of this type is used where the outputs of plural inverters are additionally AND-gated by gating sub-structure of the type described and provided in a suitable column, to provide decoder type outputs without intermediate storage. Otherwise, FIG. 1*b* is self-explanatory.

Figure 1C:
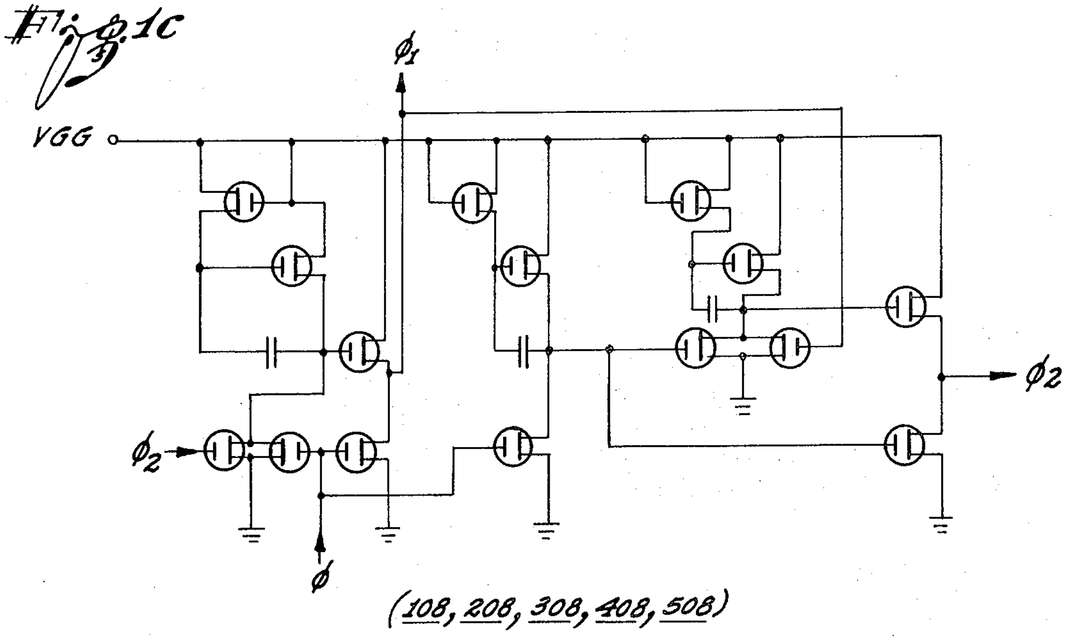

FIG. 1c illustrates representatively the conversion of an externally produced clock $\phi$ into the by-phase clock $\phi 1$ and $\phi 2$ as used on each of the chips 100, 200, . . . 500. In essence, this is a combination buffer and inverting structure.

Figure 1D:
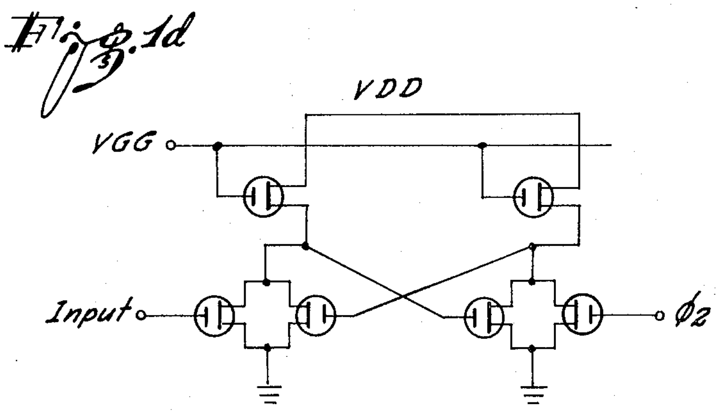

FIG. 1*d* now illustrates a particular input latch in which during phase time $\phi 1$ an input signal is applied and latched. The latch is opened or reset during $\phi 2$. In essence, this is an unclocked flip-flop, used in a manner that does not require charge replenishing or dynamic bit recirculation for quasi-storage (as provided for example in FIG. 1a).

The structure of FIGS. 1*a*, 1*aa*, 1*ab*, 1*b* through 1*d* provide basis for the elements included in the chips at an overall layout as depicted in FIG. 1*ac* and described in the following in blocks and on basis of employment and system functions. Additionally, it should be mentioned that the ROM on chip 200 includes decoding and storage structure as, for example, shown in copending application SN 38,104 filed May 18, 1970 of common assignee.

INPUT

Proceeding now to the description of FIG. 2, there is illustrated the externally operated input section 10 and the input chip 100. The input section includes the switching matrix 11 comprised of, for example, four interrogating and addressing lines 21, 22, 23, 24, establishing the input switch addressing and interrogating system 20. There are eight sense or read switch lines 31 through 38, establishing the sense system 30. The lines 21, . . ., 24, establish the columns of a matrix, lines 31, 111, 38, establish the rows thereof. Insulation diodes 39 separate the sense wires.

The manually operated switches 40 are provided for information entry upon individual keying. They are disposed particularly in the matrix intersections, one switch per intersection. The input system is, thus, wired for 32 input keys. Usually less are required so that switches on all intersections are not needed. For reasons of implementation, it is practical to use a number of rows and a number of columns which are powers of two; 16 keys were found insufficient, except for very simple calculations.

Switches 41, among switches 40 are disposed along column 22, and they are provided for input keying of so-called delayed commands. Generally, these are commands which, when given (inputted), are not to be executed immediately as usually additional operational information is needed for execution. These commands include all arithmetic commands such as (+) (−), (×), (÷), ( √ ), (%) etc. The switches 42 among the plurality 40 and circumscribed by another dashed line, are provided for figure entry, there are ten such switches accordingly. Additional switches among the plurality 40 are provided as short commands to be executed upon entry, e.g., "decimal point," "upper register display," "change display," etc.

These switches are push button switches which upon being pressed connect the respective column (addressing line) to the row (sense line) of the particular intersection, so as to pass a particularly timed interrogation signal, when on the respective interrogation line, into the particular sense wire for further processing in input chip 100.

Aside from the entry matrix 11, there are additional switches of the input section which provide control entry, independently from the entry through matrix 11, i.e., independently from an interrogating operation scanning matrix 11. These switches have been introduced above. As far as operation of the input chip is concerned, only the K-switch and the CE-switch need to be mentioned presently as only they affect directly operation of the input chip, and to which I now turn.

In essence, input chip 100 has three multi stage units which are phase counter 110, scan counter register 120, and delay command register 150. The input chip is constructed as an near-autonomous unit as far as co-operation with the switching matrix is concerned and in relation to cooperation with other chips. Provision of phase counter 110 is instrumental here. Counter 100 is under control of a gating network 102. The gating network provides gating signals in response to inputs it receives, for establishing the condition under which phase counter 110 may advance. These conditions will be developed throughout the following description of the input chip.

The count state of counter 110 is decoded in an output gating network 103, feeding to some extent its output (i.e., actually pertaining) to input gating 102 as each new phase may be arrived at from particular ones only of the phase counter. The decoded phase signals are denoted F1, F2 etc. and are explicitely mentioned only when needed for understanding of non-conventional particulars of this invention.

The normal phase for scanning the switches 40 of entry matrix 11, is phase No. 4. The resulting phase signal F4, when produced by phase counter decoder 103, enables the control gates 109 for scan counter 120. The circuit 109 receives counting pulses from an oscillator 108, which is the bi-phasing clock for chip 100 (FIG. 1*c*). This clock, of course, operates also all of the other counters and the gating circuitry as outlined above. As will be developed more fully below, circuit 109 provides for on-off operation and gating for the stages of device 120 to operate as counter. At other times (phases), gating structure 124 causes these stages to operate as shift register, clocking thereof being provided by phase counter 110.

Scan counter 120 has six (120–0, 1 . . .,5) stages, the stage of lowest order (120–0) responds to and alternates with the clock 108 when receiving a pair of counting pulses $\phi 1$, $\phi 2$. The two stages highest order 120–4, 120–5, provide a pattern of signals that is cyclically repetitive at the counter recycling rate. The resulting signals are decoded by a set of four decoder gates, 121, 122, 123, 124, the outputs of which lead to IC-pins (via buffers) that, in turn, connect to the four addressing lines 21 to 24. Therefore, the two high order stages of counter 120 together with the decoder gates provide a particularly timed and repeated sequence of addressing signals to sequentially interrogate each of the four columns 21, . . .,24, as to whether on either of them a key contact of the plurality 40 is closed.

The eight row wires 30 of the sense system are individually connected to latches 130 having their respective outputs OR'd together in gate 131. Each latch can be set upon receiving an interrogating pulse from one of the lines 21, . . . , via a closed switch 40. Such a set-input occurs on a phase time $\phi 1$ as operating the gates 121 etc. in synchronism therewith. A latch is reset on the succeeding pulse $\phi 2$. A latch of this type is illustrated in FIG. 1*d*.

It should now be observed that for each count state of the two high order stages (120–4, 5) of scan counter 120, three lower order stages (120–1, 2, 3) run through eight different, correspondingly low order count states, and in each of these low order count states two interrogating pulses are produced on two sequential pulses $\phi 1$, as the lowest, sixth stage of counter 120 toggles at clock rate and provides 1:2 reduction for the remainder of the counter. Thus, each of the gates 121, 122 etc., provides, in immediate sequence, 16 interrogation pulses, two per count state of the three low order stages (120–1, 2, 3). If a switch 40 on an intersection of the interrogation-sense matrix is closed, the first one of such pair of interrogation pulses sets a latch of latches 130, and the resulting output thereof is passed through OR-gate 131 to gates 102 so as to (1) shift phase counter 110 which, in turn, (2) halts the scan counter 120 during the next $\phi 1$, $\phi 2$ sequence.

As a consequence of this operation, the count state of counter 120 at the time of a scan and interrogation pulse that is permitted to return and to halt the counter, positively represents digitally that one of switches 40 that permitted that return. Thus, the state of counter 120 at that time is positive identification of the input key of the matrix that is being pressed.

The stage 120–0 of lowest order may be used additionally as gating signal for the counter control 102 to prevent response of the system to a rather late switch closing, too late to cause counter 110 to stop in the count state. By restricting response to a returned interrogating pulse to the first one of each pair of thusly phased row sense signals, switch closing in the second half of a second low order count state will be ignored until the next cycle.

It follows that scan counter 120 stops in a count state in which its high order stages define the column, and the the low order stages 120–1, 2, 3, define the row of an intersection with a closed switch and through which an interrogation signal passed. At this point, a preliminary investigation is undertaken as to the type of entry, figure, delayed command or immediate command.

A set of detector gates 134 responds particularly to actuation of any figure entry switches 42. This is represented by an output of OR-gate 131 throughout the period gate 123 provides the interrogation pulses, or when gate 124 provides interrogation pulses for two of the eight possible count states of the second and third low order-stages of scan counter 120. As detector 134 detects a figure entry, a corresponding marking that a figure has been entered, is set into a flip-flop 135 (single bit storage.)

The gate 122 provides the interrogation pulses for an entry that is a delayed command. Such an entry is detected by gates 138 responding to a scan-counter halt signal from gate 131 during the period gate 122 provides interrogation signals. The delayed command entry is set into a flip-flop 132. An immediate command is present on condition $\overline{122} \cdot \overline{134} = 1$, that can be suitably realized (inverters and gates 137) to control, for example, an immediate command entry flip-flop 133.

One of the immediate commands is "decimal point." That key is pressed when within a train of entered digits the operator wishes to mark that (1) the last digit entered was the lowest order decimal integer, (2) the next figure will be a fraction digit. Upon entry of that particular immediate command a decimal point flip-flop 125 is set (how, will be explained later).

It may now be assumed that a figure key for entry of one of the figures, 0 to 9 has been actuated. Further operation depends on whether or not the decimal point flip-flop 125 has been set, because "decimal point" was entered previously.

In case of a figure entry prior to entry of the command decimal point (or always when the operation involves integers only), a particular code signal is now to be developed and to be transmitted by the input chip to the program chip. In case the command "decimal point" has already been entered during the current sequence of data entry, a different code is to be developed. Neither code represents directly the entered figure, but identifies merely that a figure has been entered and whether the figure is an integer or a fraction digit.

The code is developed by the phase counter 110 in cooperation with the current state of point entry flip-flop 125, and in further response to the state of entered figure flip-flop 135. In particular, as the scan counter 120 stopped upon an entry, the output of or gate 131 shifted also the phase counter to phase No. 5. If during phase No. 5 counter input control 102 has recognized that there was a figure entry (135 set), phase counter 110 runs through seven phases No. 6 through No. 12, and for each of phase No. 6 through No. 11, decoder 103 applies a particular output bit to a buffered output gate 140. That gate is coupled to data output line 101 of the input chip. Line 101 connects to various other chips, presently only the connection to program chip 200 is relevant.

During phase No. 12, a bit is applied to the output gate 140 that distinguishes the "fraction" code from the "integer" code in accordance with the state of point flip-flop 125. The value of that bit is controlled by a gate 126 responding to the state of flip-flop 125, the state of "figure" entry flip-flop 135 and the phase signal F12. The output of gate 126 is thus transmitted by circuit 140 as last bit of the figure code.

Upon transmission of one of the two codes, the input chip signals, particularly to the program chip, that a figure entry is present. The value of the figure entered itself is contained in the count state of scan counter 120 which has stopped.

The input chip now enters phase No. 13, which is used to set figure train entry flip-flop 136. That flip-flop remains set for an uninterrupted entry of figures. Phase No. 13 is a waiting phase, during which the input chip waits for a control signal to appear in line 201, which control signal is provided by the program chip 200 when ready to have register chip 300 receive the "figure" proper. The format and switch arrangement has been chosen, so that the stages 120–1, 2, 3, 4, of scan counter 120, when having stopped on a figure entry, holds that "figure" digit in bcd-format.

In response to the "ready for transmission" control signal in line 201, the input chip shifts into phase No. 14, during which phase (signal F14) these particular stages of scan counter 120 are inter-coupled by circuit 124 to operate as shift register in response to clock signals from circuit 108. As shift register device 120 is coupled to output buffer 140 via control gates 141. In essence, gate 141 responds to the sequential bit-values set into the second highest order stage of scan counter 120 while control circuit 124 provides serial shifting among the stages of the scan counter. Phase signal F14 controlling shifting is sustained only for the duration of the signal in line 201. It lasts for four bit periods. Upon completion of shifting, the system enters phase No. 15, in which always scan counter 120 is reset for a new entry. Also, figure flip-flop 135 resets on F15.

The input chip now waits for a second external control signal, also derived from the program chip via line 202 and in dependency thereon the phase counter 110 of input chip 100 may recycle to phase No. 0. Phase No. 15 is, therefore, a waiting phase that is terminated only where other parts of the calculator circuit have completed operation to the extent that a new entry can be processed. It is to be noted that the detection of an entry per se is immediately transmitted, in form of a code; the control chip must be ready for its reception.

In phase zero, and without a "clear" from switch C present, the system shifts immediately into phase No. 1, otherwise the system stays in phase No. 0 until that key is released. In the following, circuitry will be described, which takes into consideration that the man-machine cooperation operates on vastly different "times", and that manually operable switches provide rather imperfect links.

Assuming the system is normally in the phase F4 as operational state, upon operating a switch of the matrix, the first switch closing that is being sensed is normally a temporary one due to contact bouncing. It can thus be expected that normally the input operation is triggered on bouncing before the entry is firmly closed. As bouncing usually takes longer than the entire processing of an entry, the input chip will normally arrive at phase zero, i.e., it will have completed operation before the entry switch is actually really closed! Thus, the switch may still bounce from the closing action when entry operation is already completed. In order to bridge bouncing, phase No. 1 signal F1 triggers a delay circuit 105, which meters, for example, a two milliseconds delay, clearly bridging in time the bouncing period.

After timer 105 has run, phase control 102 is caused to advance phase counter 110 to phase No. 2. The corresponding F2 signal operates (enables) control 109 to cause scan counter 120 to operate as regular scan counter. Should the counter 120 recycle without having been stopped (which, at this point, is highly unlikely as the entry switch is still closed), the control 102 advances to phase No. 3. Thus, phase counter control 102 responds to the coincidence of counter 120 recycling and no output of OR-gate 131 at phase No. 2. If, however, a switch of Matrix 11 is still closed, OR-gate 133 does provide an output prior to scan counter recycling halting the counter at the same place as before! This is used to cause phase counter 110 to recycle to phase 1, i.e., delay 105 is triggered anew etc. Thus, one can see that for as long as the input switch that was pressed initially remains pressed, input chip operates in a loop: "scan all switches - stop on closed switch - wait for 2 milliseconds - scan again all switches - etc." No transfer via output line 101 results.

After some time, the operator will release the switch he had pressed, the scan counter may recycle without having been stopped, and now phase counter 110 will advance to phase No. 3. However, the switch may not yet be fully released as there may be "trailing end bouncing;" and the entry switch just happened to be off during the switch scan as the operator begins to release it. The switch may reclose again temporarily thereafter, (trailing edge bouncing) but that should not be registered as a new entry. Thus, signal F 3 operates also delay circuit 105 to interpose another 2 millisecond delay, which suffices to bridge the "trailing edge bouncing period. At the end of that period phase counter 110 shifts to phase No. 4, to wait for another input switch closing. During phase No. 4, of course, scan counter 120 causes interrogation of the switching matrix, continuously and on a repetitive basis.

The input processing of commands differs from figure entry processing. An immediate command is recognized as an entry that is neither a figure nor a delayed command during phase No. 5; flip-flop 133 is being set by gating and inverting circuit 137. After such recognition, there is changeover to phases No. 6 through No. 12, during which phases gates 129 cause circuit 124 to provide stepping operation in which the content of scan counter register 120 is shifted directly into output buffer 140 for transfer to external use. Thus, immediate command entry flip-flop 133 controls circuit 124, to accept phase signals F6 to F12 as shift enabling control, one at a time. Additionally flip-flop 133 controls a gate circuit 142 coupling the shift mode operated scan counter 120 in buffer and gate 140 for immediate transfer of the scan counter content, digitally identifying the particular command.

Phases 13 and 14 are skipped when the immediate command entry flip-flop 133 is set, and upon phase No. 15, the register 120 is reset to zero as usual. The input chip waits during phase No. 15 for a phase recycle control signal in line 202, indicating that the processing of the immediate command has been completed. "Debouncing" through phases No. 0 to No. 3 occurs as before.

It should be noted that only one immediate command is processed to some extent already as a command in the input chip, and that is the decimal point entry command. (It is repeated, this does not refer to the decimal point position entry via switch P, but refers to actual placement of the decimal point in a train of digits of progressively lower significance, between the unit digit and the highest fraction digit thereafter). A particular gate assembly 127 responds to the corresponding count state of scan counter 120 when halted at a count state that represents actuation of the "decimal point" key of matrix 11. The point entry flip-flop 125 is set. It will be recalled that the set or reset state of that flip-flop 125 is instrumental in distinguishing interpretation of a figure entry as integer entry or fraction digit entry. The flip-flop 125 is reset on a delayed command entry, always terminating entry of a digit train.

A delayed command is characterized as such in that it remains in the input chip until the next delayed command! Delayed commands are further identified by switches on the column of line 22. Hence, if scan counter 110 is halted while the interrogation pulses are passed into line 22 (by operation of gate 122), delay command flip-flop 132 is set. In addition the following transpires. First, during phase No. 5 (which always follows a scan counter halting during phase 4), several tests are conducted, and operation proceeds in accordance with the outcome of these tests to be discussed a little later.

Generally and in most cases, the input chip responds to *a* delayed command by shifting it into the delayed command register 150, while the particular command held in that register 150 is shifted into buffer 140 for transmission to the program chip. Thus in response to a delayed command entry (flip-flop 132 being set) phase-scan control gating 129 is enabled to cause circuit 124 also here to operate scan counter 120 as shift register, as phase counter 110 steps through phases No. 6 through 12. The count state of the scan counter, of course, represents the code of the command signal key that has been pressed. In addition, a gate 143 couples the output stage of shift register 120 to the input of delayed command register 150, while concurrently the output stage of register 150 is coupled to buffer 140 via a gate 151 and as an alternative input for that buffer. At the end (phase 13) the new delayed commans has been shifted into register 150 and the command previously held therein has been applied to the date line 101. This normal operation upon a delayed command is deviated from in the following cases.

During phase No. 5 the figure train entry flip-flop 136 is tested, and the operation above proceeds if flip-flop 136 is set, as normally a delayed command is entered only after a figure entry. If flip-flop 136 is not set, then the preceding entry was a command, and is assumed to have been a delayed command, which the present delayed command is to supercede. Thus, gate 152 opens only when flip-flop 136 is set, which is indicated as an input for that gate. When flip-flop 136 is not set, the content of register 150 is in effect dumped and the delayed command code held in scan register 120 is set into register 150 as substitution!

A different situation is present if the delayed command is an "equal" and the K-switch has been set. This combination of switch operation is used to establish the condition that the operation as defined by the content of delay command register is to be carried out again, using the same multiplier or divisor that was previously entered. The saving of that latter operand is not of immediate importance for the input chip. However, as to the circuit of the input chip, the equal - command is executed on the input chip for shifting the delayed command held in register 150 through buffer 140 to line 101 so that the control chip can execute that command and accordingly, while the same command (a "divide" or "multiply") is recycled back into register 150.

The content of scan counter 120 (representing equal) is ignored as far as further transmission is concerned. Instead, a gating circuit 128, coupled to scan counter 120 and deciding equal is present, responds to inhibit gate 143, and the command held in register 150 is not only transmitted as usual, for a delayed command, but it is recycled, via a gate 153. Strictly speaking the delayed command equal is not executed per se after a delayed transmission. Rather it is included in that class of commands so that particular operations for that class of commands are executed on the input chip, particularly for shifting the previous delayed command out of register 150 for purposes of transmission and execution.

At the end of the shifting operation involved as input processing for a delayed command, the delayed command previously held in register 150, has been transmitted out of input chip 150 to the control chip 200, and the operation called for is carried out, which does not require further participation of the input chip. Phase No. 13 on delayed command operating condition resets figure train entry flip-flop 136, as a normal delayed command entry always succeeds entry of operand digits. This way, an immediately following delayed command entry can be recognized as substitution for the one just entered.

Also, the "point" flip-flop 125 is reset so that the figures entered subsequently can begin with integers until the point command key (not P!) is activated. Should the next digit train all be fraction digits, the immediate command key "point" has to be pressed and flip-flop 125 is set again.

Either or both flip-flops 135, 125, may be in the reset already, for example, because the delayed command was entered for purposes of substitution as described. Also, there may be no decimal point operation involved at all!

Phase No. 14 is used only on figure entry and is, thus, skipped on delayed command entry, phase No. 15 resets the scan counter 120 as usual and the system waits for the un-busy signal from the program chip via line 202, whereupon the input chip recycles to phase No. "0".

It should be apparent from the foregoing that entry of a delayed command causes an undelayed transfer of a similar type (possibly different) command to be outputted by chip 100. Thus, *a* delayed command must be present ab initio, without entry, in register 150. This is the "add" command. Each "clear" operation signal arriving at input chip 100 via line 402 resets everything but places a code into register 150 that represents the "add" command. As will be described below, this command is executed generally in that a digit train previously entered is added to the content of the accumulator in the register chip 300. Initially, the accumulator is empty so that automatic execution of that command just amounts to loading of the accumulator, so that the input register on chip 300 is enabled to receive the next operand without loss of information previously received.

Finally, it should be pointed out that the clear entry switch CE merely governs resetting of figure train flip-flop 136 and of the point flip-flop 125 because by the time an operator realizes he has made a figure entry mistake, that wrong figure has "long" left the input chip: Thus, in essence, the operation of input switch CE (that is outside of key matrix 11) places the input chip into the operational state it had after inputting of the last delayed command key. If now a new figure is entered, a subsitute operand is in fact entered. If a different delayed command key is pressed the previous one is replaced as described.

In summary, the input register is normally in phase No. 4. Scan counter 20 runs continually activating sequentially the columns 21 to 24 of the switching matrix. As a key is pressed, a scanning or interrogating signal is returned therethrough and passed through a line of rows 30 at a time that corelates the state of the scan counter with the key pressed. The scan counter halts. A preliminary test identifies the class of key (figure, immediate or delayed command) and one of the flip-flops 135, 133, 132 is set. In case of a figure it is tested whether it is an integer or a fraction digit. A corresponding code is transmitted through phase counter clocking and value identification (scan counter state) is transmitted upon demand made by the control chip via line 201. In case of an immediate command, the scan counter state is transmitted as command identifying code; in case of a delayed command (other than equal, the scan counter state is shifted into register 150 and its content held therein up to that time is transmitted. The input chip remains non-responsive until released by a signal in line 202. The input chip then covers the period of contact bouncing and persistence of closing, and moves into the regular scan phase No. 4 only after a "no key pressed" period has been detected for at least 2 milliseconds.

A regular data entry proceeds as follows. The P-switch (external to the matrix) is pressed, and subsequently, usually one digit or figure key is pressed. Under these circumstances, the digit so entered defines the relative position of the decimal point designed for subsequent figure train entries, thereby defining how many integers can be entered and how many fraction digits to be entered, will be considered within the input capacity of the calculator. The over-all capacity of the machine limits both. P-switch action does not involve the input chip and is mentioned at this point only for completion.

Next, P-switch is released and one or several figure keys are pressed. Usually, but not necessarily, these are integers at first. The integer code is transmitted followed by transmission of scan counter halt state. This is repeated for each digit entered. Next (or immediately) the short-command key "point" is pressed so as to set the flip-flop 125 causing subsequent figure entry code modification; subsequent figures keyed in are entered as (decimal) fraction digits. After the first multi-digit operand has been entered (it does not have to be a multi-digit operand), a delayed command key is pressed to key in the desired arithmetic operation ("multiply," "divide," "plus," "square root," etc.) As a consequence, the initial "add" command in register 150 is transmitted, and extended, to load the accumulator.

Next, another figure operand is entered as the second operand with or without decimal point as the case may be. After entry of the second operand has been completed, the equal delayed command key is pressed, and the previously entered arithmetic command is transmitted so that the particular arithmetic operation is carried out. Note, that the arithmetic command does not have to be repeated as to entry. If the K - switch is pressed concurrently, the particular arithmetic command is not only transmitted but recycled so as to remain in register 150. In either case, repetition keying of the arithmetic command prior to equal is not necessary.

REGISTERS

The principle data storage facilities of the calculator are contained in the register chip 300 which has three principle, relatively large shift registers, each providing storage for sixty bits. There is an accumulator register 310, an input register 320 and a multiplicator-quotient register 330. Each register has an extension, respectively 311, 321, 331, which extensions are small, four bit shift registers; they are normally coupled serially to the inputs of the respective one of the three principle registers. Thus, normal register circulation involves principle register with extension and provides storage for 64 bits or 16 bcd-characters. The temporary removal of the extensions (four bit periods) amounts to a relative shift of the circulating bit string to the right, corresponding to a division by ten.

The bit circulation for each register runs through a set of control gates 312, 322 and 332 respectively. Each register has an output buffer, 313, 323 and 333, respectively (FIG. 1*b*) and the outputs are respectively coupled back into gates 312, 322, 332. These gates operate under control of the micro program as part of the execution thereof. Thus, the six lines 203 of the eight outputs from the ROM-readout circuit are connected to the register chip to be decoded in a decoder gate circuit 340 thereon, so as to provide the necessary gating signals that modify normal data circulation in the registers. Such modification includes relative shifting of data through temporary exclusion of the respective register extensions; also, the content of each register can be copied into each of the respective other registers. This is symbolical represented by interconnect lines between the gates 312, 322 and 332.

Additionally, and also under control of decoded microprogram operate codes, a bit stream from the arithmetic chip may pass to the register chip via connection 401, to be set into the accumulator 310 as updated content. This data flow is controlled also by gates 312. Accumulator output buffer 313, in turn, provides its content to output line 301 for copying into the arithmetic chip.

Date line 101 from input chip 100 is coupled to the gates 322 for the input register, and under appropriate operation codes, data applied by the input chip 100 into line 101 are received by the register chip. It must be noted, that not all data furnished by input chip 100 on line 101 are accepted by the register chip. Only operand figures will be accepted. The sorting is done by the decoder 340. The output buffer 323 of the input register applies its content to output line 302 for copying into the arithmetic chip.

The line 204 feeds data from the ROM chip 200 to register 330 under control of gates 332, appropriately controlled during execution of multiplication and division operation. Output buffer 333 receives data from the register 330 to pass them to the ROM chip via line 304. The circulation path is closed by an iteration counter 231 therein. The circulation involves multiplier counting and quotient build up. Either operation is controlled by the controls program loops.

A four bit auxiliary register 341 is provided for temporary insertion into either of the three principle registers, as as to obtain a data shift to the left, i.e., data are being delayed by four bit positions in their circulation, if that auxiliary register is inserted for one circulation period corresponding to a multiplication by ten. Gates 342 are operated also by program execution (decoder 340) to obtain temporary insertion. Chip 300 has also its own bi-phase clock connector.

The clear entry switch CE which does not pertain to the regular switching matrix, is operatively connected to gates 322 for interrupting data circulation in the input register (from buffer 323 back into the input stage) to clear the register. The P-switch, when set in effect, inhibits loading of figure digits into the input register, because, as stated above, when the P-switch is set, subsequent figures define the relative position of the decimal point rather than data.

PROGRAM CHIP

The program chip 200 includes a read-only memory 210, an address register 215 with address decoder 211 and an output decoder 240. Additionally, this chip includes a point position register 230, a control counter 220 and an iteration multi-purpose counter 231. The remaining circuitry involves additional gating and buffer circuitry of the type outlined above. The chip has also its clock 208 similar to clock 108 (FIG. 1*c*). Reducing stage 204' provides 4:1 reduction to obtain a clock that establishes decimal digit time (16 per register circulation), i.e., for counting down the bit clock to decimal digit clocking.

With the exception of the figures themselves, all data set by the input chip into data line 101 arrive at the control chip 200 and are treated therein as addresses to the read-only memory 210, and are passed into address counter-register 215. In case of figure entry, data line 101 provides one of two different codes. A first code is provided when the entered digit is an integer, the second code is provided when the entered figure is a fraction digit. It will be recalled that the distinction is made simply by a test in the input chip whether "decimal point" has been keyed in as an immediate command or not. The two different codes represent different subroutines for the program.

The address register 215 is coupled to the data line 101 via gate 216, provided a "ROM-busy" flip-flop 212 is not set. ROM-busy flip-flop 212 is set on a "1" entering the lowest order position in address register 215. All addresses entered from the input chip have a low order digit "1", as the last stage 120–0 in scan counter register 120 is always in the "one" position upon scan counter halting.

Busy flip-flop 212, when set, blocks gate 216 so that subsequent data on line 101 are not interpreted as address. The busy flip-flop 212, when reset, provides also the "unbusy" control signal to line 202 to cause input chip phase counter 110 to recycle to phase No. 0. As long as flip-flop 212 on the control chip 200 is set that recycling on the input chip is inhibited. The flip-flop 212 is reset by an operate code extracted from the read-only memory upon the end of any executed microprogram (path 214) except for overflow and other error program terminations.

Read-only memory 210 has 128 word addresses, fifteen bit positions per address. Of these, seven bits define the next address, eight bits define control information (operate codes). Gating path 213 is coupled to the seven outputs of ROM 210 to interpret respective seven read-out bits as address for the next accessing step. These seven bits are set in parallel into address register 215. The program advance in this manner is times by the signal DTF, issued by the arithmetic chip at the end of each register cycle into line 404. Another input for the memory address gates 213 is line 406. A test signal, or absence of a test signal, may at times issue from the arithmetic chip, indicating a microprogram branch condition so that the address to be set into address register 215 is modified accordingly.

Six of the eight data outputs lead to buffers that feed the six lines 203 which provide operate codes to the arithmetic chip 400 and to the register chip 200, in parallel, for scanning processing therein. Additionally, the "local" operation decoder 240 of chip 200 is connected to these six ROM output lines, so that certain operations are carried out also in control chip 200.

As stated, the program chip includes additionally a plurality of registers and counters. First, there is the control counter 220 which counts the number of multiplier digits examined during a multiplication and the number of quotient digits generated during a division. The iteration counter 231 counts the number of times a multiplicand has been added to the partial product in multiplication and the number of times that a divisor has been subtracted from the partial remainder (initially the dividend) in division.

The iteration counter 231 is additionally operative for phasing the transfer of the value of a figure entered, from the input chip to the resistor. In particular, counter 231 controls the positioning of a four-bit bcd digit in the data register 320 of register chip 300. During the operation of transferring a figure digit from the scan counter 120 of the input chip to the register 320, the counter 231 is decremented once each digit time (four clock period). When the value of the counter 231 passes through zero a count state zero detector 221 responds and the control signal 201 is provided for four clock periods as gating signal to be used in the chips 100 and 300 for causing the bcd figure in the scan counter 120 to be transferred over signal line 101 into the register 320. As counter 231 is incremented in steps for a full register cycle period, the counter 231 has decremented until its initial value is restored. It must now be considered what the initial count state of counter 231 is to which it returns.

The point position register 230 holds information of the relative position of the decimal point within the chosen format. As stated, the code held in the register 230 merely represents how many digits can be integers and how many can be fractions for the multidigit entry herein. The register 230 has been loaded when actuated P-switch couples line 101 to the P-register at a time a figure proper (in bcd-format) appears in line 101. Gating 232 provides appropriate loading control, provided the microprogram has arrived at the operation that is required for calling on the input chip to furnish the last entered digit in line 101 (link 120–141–140).

For a regular operand figure entry the register 230 is deemed loaded. Operand integers will be entered always immediately to the left of the position as defined by point position register 230, while each previously entered integer is shifted by one decimal (for bcd) position to the left. This latter shifting is carried out in the register chip as part of executing the figure entry microprogram as described below.

As for the ROM-chip, the content of counter 230 is transferred to counter 231, serving as register without modification for entry of an integer. Gates 233 controlled by microprogram 241 provide for the transfer. The content of counter 231 provides the information as to how many digit periods (of four clock periods each) will pass by during the particular register cycle in which the bcd figure is entered into register 320. For regular entry the signal on line 201 is produced when the number of digit periods corresponding to the position of the decimal point (counting from the right hand display digit) have passed by. After the correct number of clock periods have passed, counter 231 cycles through zero, detector 221 responds and the four clock period signal on line 201 is activated, whereupon promptly the input chip furnishes the four bcd-bits into line 101 that are set into the register chip at the correct time, for them to be included in desired position in the data circulation of the input register of the register chip.

As a result of this operation, entered integers are always placed into the position immediately to the left of the decimal point. For fraction digit entry, the respective digits are entered first to the rigt of the decimal point, the next one in the next bcd position to the right, etc. For this, register 231 serves as iteration counter 231.

Before an entered digit is recognized as a fraction digit, the "decimal point" command must be given. As part of the execution of the immediate command "decimal point," the content of register 230 is set into iteration counter 231, because during fraction digit entry, no such transfer takes place. For each subsequent figure entry, the content of the counter 231 is decremented by one, so that the production of the control signal in line 201 is correspondingly phase shifted within the respective register circulation cycle. As a consequence of this modified timing, the fraction digits are sequentially placed into positions progressing to the right from the decimal point. The test circuit 221 is also operating here for determining whether the content of counter 231 has been reduced to zero as that establishes that the adjusted capacity for fraction digit entry has been exhausted, and further digits are then disregarded.

Iteration counter 231 is time-shared and serves as loop counter (or determining exiting from program loops) during multiplication and division. For example, in case of multiplication, a multiplier digit is entered via line 304 and gates 243 into register 231, under control of microprogram execution of the ROM-register chips for these arithmetic operations. The test signal in line 406 serves for decrementing the content of counter 231 in these cases. Each such test signal originates in the arithmetic chip in representation of another adding of the multiplicator (held in the input register 320) to the accumulator (310) content. The content of the register counter 231 is tested before each decrementation by the "is content of counter 231 zero"-test unit 221, and the adding operation proceeds until the content in register counter 231 has been reduced to zero whereupon the program branches (control of gate 213 by input from 221) to shift the content of register 330 for one decimal digit (four bit) positions, loading the next bcd-digit into counter 231 via line 304 etc.

For a divide operation counter 231 is used to progressively build-up quotient digits. A four bit digit that has been build-up is shifted into the M/Q register 330 under control of the processor 241 via gates 244 and line 204. The concurrent application of these signals to line 201 is of no effect in the input chip, as the signal in line 202 holds the input chip down during these arithmetic operations.

OUTPUT CHIP

The output chip 500 is also essentially composed of a plurality of shift registers, counters, input gates and output buffers. Among these registers is a four stage bcd input register 510 serially coupled to the data line 401 as leading from the arithmetic chip. The register 510 has four parallel output buffers and latches 511, from which the digital information to be displayed can be derived. Basically, all data as set by arithmetic chip 400 into its output line 401 is available for display, the display proper is subject to timing and position selection to be described.

The output chip includes, additionally, a digit position counter 520, which is (a) reset by the sync clear pulse in line 402, and (b) incremented by the output of a four-bit recycling (bit) counter 522, receiving the common bit clock via local biphase circuit 508. The digit position counter 520, preferably a Johnson counter, constructed so that only one stage changes state for each counting step. The counter is incremented at bcd-digit rate and in effect parallels control counter 220 on the ROM chip. The output of counter 520 is decoded and reencoded to provide a one-out-of-eight code signal. For this, circuit 521 is provided whose eight outputs connect to the eight display position control lines 52 that control the external display tubes 55 introduced above.

The initial state of counter 520, after reset, represents, in time, whether the eight low order digit or the eight high order digits of the sixteen content of register 320 (or of accumulator 310) are being currently presented on line 401. Only one such eight digit group can be displayed by eight tubes. The selection is made by a selector flip-flop 525 which determines which one of two possible initial states of counter 520 is established when the chip is reset prior to display operation.

The operation of flip-flop 525 is under control of a decoder circuit 540 which connects to lines 205 for providing execution of particular, ROM produced instructions that determine the desired display. The flip-flop 525 can be set pursuant to execution of a microprogram for the immediate command, "display lower register." The flip-flop can be reset pursuant to execution of a microprogram for immediate command "display lower register." Finally the flip-flop can be toggled on command "change display."

Depending on the state of flip-flop 525, display is restricted to the upper half or to the lower half of the content of the register to be displayed. For this, depending on the state of such flip-flop 525, the upper half or the lower half of all counter positions of the 16-bcd digit recycling counter 520 are blocked off, so that only 8 decodable bcd-position signals are provided by the counter, per register circulation cycle.

A register 530 holds duplicate information on the relative position of the decimal point. The register 530 receives its content from data line 101. The connection 205 between ROM-chip 200 operates controls 515 in chip 500 to restrict the loading of register 530 to those data that in fact represent the point position. The point position is compared with the current state of progressively incremented digit position counter 520, by means of a comparitor 531. Upon agreement, line 53 is raised to indicate to the display, that decimal point is to be displayed concurrently with the display of the digit that is displayed in the particular position as indicated on one of the lines 52.

ARITHMETIC CHIP

The arithmetic chip 400 is mentioned here only perfunctionally as most of its details are conventional as such. Reference numeral 410 denotes the arithmetic logic proper. In essence, the circuit 410 combines the bit streams as applied to it via lines 301 and 302, and as respectively derived from the accumulator register 310 and from the input register 320 on the register chip. These arithmetic operations include essentially the additive and the subtractive combination of the bit streams on lines 301 and 302 on a four bit group per four bit group basis with carry operations from group to group.

The particular operations are controlled at any instant by processing circuit 440 which is connected to the six lines 203 that lead from the ROM read-out buffers to the arithmetic chip (and, parallel thereto, to the register chip as described). The process control 440 essentially controls enabling and effectiveness of the arithmetic logic 410 as particularly combining the bit streams. Additionally and in dependence thereon, control 440 operates a display select circuit 412, which in the essence is a flip-flop with a pair of enabling gates, coupling either the bit stream from line 301 (accumulator), after combination thereof with the bit stream from line 301, or the bit stream from line 302 itself (input), to a buffer 413 that drives the data output line 401 of the arithmetic chip. Thus, depending on the state of select gates 412, the content of the input register can be displayed directly, merely passing through the arithmetic chip during figure entry.

After execution of an arithmetic operation as commanded, the modified accumulator content is displayed as result and on a continuing basis. Display of the accumulator could be deferred until completion of the arithmetic operation so that the display involves only the content of registers 310 and 320, without display of data as they have just been processed. That, however, could be controlled on chip 500. Moreover, execution of any arithmetic program is so fast, that for the observer only final results are in fact visible.

The output of buffer 413 as applied to line 401 recycles also into the register chip as that line connects to chip 300. This way, arithmetically up-dated information is returned into the accumulator. The normal circulation in the registers of the register chip is not upheld in that manner, but is carried out on the registers themselves. Thus, the recognition of data on line 401 as an input for the register chip requires microprogram instruction execution on that chip.

The arithmetic chip includes an overflow testing circuit 420, which, during figure entry, monitors whether or not any figure has been shifted into the eight high order positions. If so, an overflow indicator 57 goes on (line 405). Thus, a constraint is provided according to which a figure train entered in representation of a multi-digit number should have no more than eight decimal digits. The circuit 420, thus, includes a flip-flop in representation of a high order register circulation-tracking counter stage, providing separate identification for circulation (and presentation on the output buffer) of the first eight digits in any of the registers of the chip 300, and of the remaining eight digits. Only one of these two groups of eight digit positions each are to affected by the loading process. Any bit in the "wrong" group triggers an overflow.

During some arithmetic operations, such as "add" or "multiply," the overflow tester simply monitors a positive carry after processing of the respective digits of highest (sixteenth) order. Also during arithmetic operation, for example, after each subtract operation, it is tested in a circuit 430 whether or not the reduced accumulator content has turned negative. The outcome of the tests are signalled to the ROM-chip via test line 406 as that determines continuation (branching or not branching) of the microprogram that is being executed. In essence, the circuit 430 sets a control bit into a buffer for insertion in line 406.

The arithmetic chip, additionally, includes the data timing circuit. The external oscillator 60 determines the rate of operation, i.e., its clock pulses $\phi$ are applied to all chips for bit-synchronization (and for production of the biphase clock needed for MOS operation). Only one chip, however, contains the means for synchronizing overall operation to the cycle rate of the registers (64 bits - 16 bcd-characters). Thus, there is a bit counter 450 that counts 4-bits on a cyclic basis. Its output is a pulse train that determines the digit rate, and a 16-digit counter 451 counts these pulses on a recycling basis, its cycle rate being equivalent to the register cycle rate. The high order stage of counter 451 may be the flip-flop used in the overflow testing device 420.

Two pulses are derived from counter 451 by operation of a count state decode gating circuit 452. The first pulse is set into line 403 and is called DTZ (Digit Time Zero). DTZ is true for four bit periods at the beginning of each data register cycle, and is used in register chip 300 and in ROM-chip 200 as zero mark in the respective register circulation. The second pulse is called DTF (Digit Time Fifteen) and is set into line 404. Signal DTF is true for the last four bit periods and is used particularly to time updating (input clocking) of the memory access counter 215 on the ROM-chip.

Finally, the timing circuit on chip 400 is coupled to the "clear"-switch C in response to which a clear signal is set into line 402 for use in all chips to reset everything and to clear all registers. Particularly, the circuit 453 synchronizes the clear and resetting operation, so that upon release, all registers begin circulation at the same phase point.

OPERATION

The operations involved, pursuant to a figure entry, shall now be described. It will be recalled that in response to closing of an input switch 40 of matrix 11 scan counter 120 is halted and particular code bits are applied to line 101. In case of a figure entry, these codes distinguish merely between the type of figure integer or fraction digit. As that code is set to line 101, it enters the ROM addressing register 215. The first bit (a "1") sets busy flip-flop 212 to block acceptance of further data from the input chip in that the corresponding signal in line 202 prevents the input chip from recycling to phase "0." Scan counter 120 remains halted, as its count state represents the value of the entered digit.

Assuming the integer code is set into program address register 215, an integer entry microprogram is started. The first instruction to be executed as result of entering the particular microprogram is executed on the ROM-chip by loading the point position code held in register 130 into iteration counter 231. The content defines in time the relative position of the figure to be entered in the input register 320. As integers are always entered directly to the left of the decimal point, the content now held in counter 231 defines the relative position of digit entry. In case only integers are entered, register 230 has not been loaded previously and, thus holds all zeros in representation of an implied decimal point all the way to right.

After loading, recycle control 213 takes seven bits of the read-out word to load addressing register 215, whereby the digit time fifteen signal DTF provides clocking, as instructions are executed in synchronism with register circulation. The next instruction is executed on arithmetic chip 400. In particular, display selector 412 is operated to couple input 302 to the output buffer 413 (controlling the bcd-output line of the chip 400) for transfer of data from the input register to the output chip. The execution of that instruction for obtaining this transfer has a persisting effect as it sets the display selector into the required state to remain set until superceded by execution of a different instruction in a different program according to which the content of the accumulator is to be displayed.

The third instruction of the figure entry microprogram is executed on the register chip. Particularly, register 341 is inserted (on cycle time zero) in input register 320 to temporarily extend circulation thereof, corresponding to a position shift of the entire content thereof by four bit positions to the left corresponding to a multiplication by ten. This, in effect, empties the four bit positions directly to the left of the decimal point. Execution of this instruction requires, of course, a full register cycle.

The next instruction (or being part of the previous one) is a test whether the P-switch is set. The outcome of this test determines particular continuation of the program.

Assuming the P-switch is not set, the microprogram proceeds to execution of an instruction that results in the production of the control signal affecting the data transfer from the input chip to the register chip.

Iteration counter 231 tracks the circulation of the digit position in the input register 320, available next for loading. Upon recycling through zero, circuit 221 issues a timed control signal into line 201, called "transmit figure," for the input chip to apply the content of scan counter 120 to line 101 for proper insertion into the circulation of register 320. Register 231 recycles fully to arrive again at its starting state without modification at that point.

Concurrently with the production of the date control signal, the same instruction is executed also on the register chip to cause gates 322 to establish a transfer path from line 101 into register 320. Line 101 is held to ground potential so that noise is not introduced until the time for transmission of the data bits has arrived. Note, that the four bit timing signal from line 201 is also applied via line 204 to the register chip! The phase of the timing signal in line 201 is, of course, selected so that the data in line 101, from scan counter 120, flows into the input register to occupy the just emptied position.

The next instruction is executed on the arithmetic chip, to test overflow condition; if there is an overflow, indicator lamp 57 is turned on. Also, in case of overflow, a signal is passed through test line 406 to the ROM-chip 200 modifying the next program address for branching to a halt which is not the regular end of the program. Lamp 57 provides halting indication. Under these conditions, busy flip-flop 212 cannot be reset and new data cannot be accepted until cleared.

In case there is no overflow, the ROM cycles to address 0 . . .0, causing busy flip-flop 212 to reset, whereupon an un-busy signal issues in line 202 to cause the input chip to recycle to phase No. "0, " to be in position to accept a new entry after the previously activated key has been released.

Next, I proceed to description of a fraction digit entry. The program starts from a different address as the code transmitted by the input chip is a different one. Moreover, as will be shown below, the decimal point position number (or a smaller number) has already been loaded into register 231. Now, as a first instruction execution processor 241 causes the content of iteration counter 231 to be tested, as it must not be zero. The content of register 231 is zero under two conditions: The decimal point is all the way to the right as a non-zero position was not entered prior to entry of an operand. (Position zero). In this case, any figure entered after pressing command key "decimal point" will be disregarded. Alternatively, if there are no more positions available to the right of the last fraction entry (overflow), the program jumps to 0 . . . 0 (program end) and ignores also the entry. The former case is actually a special situation of the latter.

If the content of register 231 is not zero, processor circuit 241 causes it to be decremented by 1, thereby defining a position entry to the right of the previous entry. That may be to the right of the last integer (i.e., immediately to the right of decimal point) or to the right of last entered, next higher order fraction digit. Now, the program is acutally continued, as in case of integer entry. The content of register 231, now modified, determines the phase of data transfer between chips 100 and 300.

Decimal point entry is chosen as one example of entry of an immediate command. The input chip, when detecting the decimal point entry as the immediate command just keyed in causes the corresponding scan counter number to be shifted into line 101, and from there it will be set as address into address register 115. The next (and only) instruction of that microprogram is executed on the ROM-chip; it causes the position number for the decimal point to be transferred from register 230 to register 231 to remain thereon for the following digit entry or entries. The particular command causes also the flip-flop 125 in the input chip to be set so that subsequently entered figures are recognized as fraction digits. The next digit entry is a fraction digit and finds the decimal point in register 231. Upon having loaded register 231, the program returns to address (0).

Microprograms for other immediate commands refer to the display. Upon execution, flip-flop 525 in output chip 500 is set, reset or toggled. it will be recalled, that 16-bcd character positions are available in the input registers, but only 8 can be displayed; which of the two groups is to be displayed is controlled by these commands.

A different mode of operation is the point position entry. As stated, without further measure the decimal point is normally treated as being located all the way to the right of input register capacity and display configuration. The decimal point can, however, be placed differently. For this, the P-switch is pressed. This switch is not part of switching matrix 11. As now a digit is entered, it is interpreted as defining the decimal point position, not as a data digit.

The program may conveniently progress as in case of a regular figure entry, up to the point of the control signal in line 202 for signalling to the input digit issuance of the digit in bcd format. Now, however, with the P-switch being pressed, that digit is (a) gated in register 230, and (b) is not permitted to enter the input register, i.e., the depressed switch P blocks the path from line 101 through gates 322.

Additionally, in response to that same control signal, a signal is generated for transmission via lines 205 to the output chip. That chip has its register 530 connected to line 14, and local processor 540 enables the input for register 530 to receive the decimal point position digit to be available for the display control. The microprogram is terminated as before.

I now turn to the description of the processing of delayed commands. For this, it must be pointed out at first that an "add" command is always held in register 150 of the input chip. In other words, when the machine is turned on, or cleared, a bit pattern is set thereby into register 150 that is an "add" command. A computing program begins usually with entry of one or several digits, followed by a computing command (add, multiply, etc.) As such a delayed command is recognized in the input chip (by corresponding recognition of the state of counter 120), the content of scan counter 120 is set into the delayed command register 150, while the content of the latter is passed into the data line (unless the figure flip-flop 125 was not set). Thus, with (any) first delayed command entered, an "add" command appears in line 101. At that point, digits have been entered and circulate in input register 320.

As the "add" command appears in line 101, it is set into the address register 215, to be interpreted as the first address of an "add" microprogram. The first instruction is decoded in the arithmetic chip as well as in the register chip, and as a consequence, the two bit streams circulating in registers 310 and 320 are additively combined in the arithmetic chip and returned to the accumulator register 310 via line 401 and the gate 312. Of course, during this very first "add" command, the accumulator is empty, so that the execution of the add instruction amounts to a transfer of the content of the input register 320 to the accumulator.

The next instruction causes overflow and sign testing. Overflow testing is, of course, superfluous as to this initial loading. However, subsequent add commands are executed in the same way.

It can be seen further that the equal command, as a delayed command, has merely the function to cause the previously keyed in arithmetic command to be shifted out of register 150 to be executed.

The invention is not limited to the embodiments described above but all changes and modifications thereof not constituting departures from the spirit and scope of the invention are intended to be included.

I claim:

1. In a desk calculator having a first plurality of interrogation lines; a second plurality of sense lines disposed relative to the lines of the first plurality to establish a matrix, each line of the first plurality, further having switches disposed in the intersections to respectively interconnect the two lines in the respective intersection; the improvement comprising in combination:

first circuit means connected to the lines of the first plurality to sequentially and periodically introduce interrogation signals effective on all of the switches;

second circuit means connected to the lines of the second plurality and interrogating all of the lines of the second plurality to respond to an interrogation signal that is passed through a closed one of the switches and the line of the second plurality on the closed switch, the first and second circuit means including a recycling scan counter for providing the interrogation signals, the counter being halted in response to a signal in a line of the second plurality, the state of the counter constituting a representation of identity of the closed switch;

third circuit means connected to the second circuit means and respectively responsive to the different ranges for count state numbers for interpreting the state of the counter when halted as command or as figure entry into the calculator;

fourth circuit means connected to the third circuit means providing arithmetic operations in response to a command entry; and fifth circuit means connected to the third circuit means storing digital representation of a figure entry.

2. In a desk calculator as in claim 1, further including a read-only memory for storing a microprogram, said command representation constituting the starting address of a microprogram, the third circuit including means to provide a particular digital representation for all figures as starting address for a figure loading microprogram, the fourth means receiving digital representation of the value of an entered figure upon execution of the loading program.

3. In a desk calculator as in claim 1, including circuit means connected for delaying operation of the first circuit means for a predetermined minimum period from the time of response of the second circuit.

4. In a desk calculator as in claim 1, the first, second and third circuit means included in the first MOS integrated circuit chip, having an output line for providing serially digital information representing the command and figures;

the fourth circuit means including a second MOS-chip storing a microprogram and connected to receive the digital information to operate different portions of the microprogram;

the fourth and fifth circuits means including a third MOS-chip holding a plurality of registers including an input register and an accumulator and connected to the first and second chips for the input register to receive and to assembly sequentially figures in serial format; and circuit means operating in response to microprogram execution and using the accumulator to arithemetically process the entered figures.

5. In a desk calculator as in claim 1, including an input switch and a particular register, the input switch, when pressed, causing a subsequent figure entry to load the particular register; and circuit means connected to interpret the content of the loaded particular register as decimal point position.

6. In a calculator as in claim 1, including a storage register for holding digital representation of a command;

first operating means responsive to the first characteristic of a representation of a command entry as provided by the third circuit means, for causing transmittal of the command held in the register and subsequent replacement thereof by the representation of the particular command entered; and second operating means responsive to a command as transmitted by the first operating means and operating the fourth circuit means, to obtain the operation as represented by the transmitted command, so that any command is executed by the fourth means only upon subsequent entry of another command or upon repeated entry of the same command.

7. In a calculator as in claim 6 and including means to prepare the calculator for another operation and information entry, and further including means to set representation of an "add" command into the register, so that the "add" command be executed upon entry of the next command.

8. In a calculator as in claim 1, the third circuit means further responsive to specific characteristics for distinguishing digital representation of an immediate command and of a delayed command; the calculator including additional circuit means for storing the digital representation of a delayed command, further including execution logic responsive to a stored delayed command only upon subsequent entry of another delayed command for causing the fourth means to execute the stored delayed command, and further responsive immediately to entry of an immediate command for causing execution thereof.

9. In a desk calculator as in claim 1, further including program means responsive to different addresses for control of arithmetic operations and loading operations, further including register means for storing the digital representation of an entered command as an address and access means for accessing the program means for initiating an arithmetic operation in response to a command address as stored in the register means and as transmitted to the access means in response to the first characteristic of a digital representation as representing a subsequently entered command about to be stored in the register means; the fifths means including means responsive to the second characteristic of a representation to provide a particular address to the access means for accessing the program means, the program means so accessed providing for the storing of the digital representation of the figure entry.

10. In a desk calculator having a first plurality of interrogation lines; a second plurality of sense lines disposed relative to the lines of the first plurality to establish a matrix, each line of the first plurality providing intersections with each line of the second plurality, further having switches disposed in the intersections to respectively interconnect the two lines in the respective intersection; the improvement comprising in combination;

first circuit means connected to the lines of the first plurality to sequentially and periodically introduce interrogation signals effective on all of the switches;

second circuit means connected to the lines of the second plurality and interrogating all of the lines of the lines of the second plurality to respond to an interrogation signal that is passed through a closed one of the switches and the line of the second plurality on the closed switch, and connected to the first circuit means to establish digital representation of identity of the closed switch;

third means connected to the second circuit means for processing the digital representation and signalling completion of processing;

fourth circuit means connected to the second circuit means for halting operation of the first circuit means in response to an interrogation signal as passed through a closed switch and for controlling resuming of the operation of the first circuit means in response to completion signalling by the third circuit means; and fifth circuit means operating in response to said controlled resuming of operation of the first circuit means for inhibiting operation of the third means upon repeated response by the second means to persisting switch closing.

11. In a calculator as in claim 10, including delay means to particularly delay the resumption of the operation by the first means for a period beginning with the response by the second circuit means to closing of a switch, said period covering approximately the duration of bouncing of the switch upon switch closing.

12. In a calculator as in claim 10 and including delay means operating in response to absence of a switch closing as recognized by non response of the second circuit means following a response by the fifth circuit means, to delay the resumption of operation of the first circuit means for a period covering approximately switch bouncing upon key release.

13. In a desk calculator having a keyboard which includes keys arranged in a matrix, sensing lines and interrogating lines intersecting in the points of the matrix and connectible thereat respectively by the keys, further including accumulator register and arithmetic means for storing digital information and carrying out arithmetic operations on the stored information; the improvement comprising:

counter means operating on a cyclic basis and connected to the sensing and interrogating lines so that each count state of the counter means is associated with a key, and a pulse is produced when the key as corresponding to a count state is closed;

first circuit means responsive to a pulse when produced and to a first range of count states of the counting means for issuing a particular code;

program means connected to be responsive to the particular code to initiate accumulation loading operations including placing digital signals corresponding to a count state in said first range into the accumulator register, the count state being identified by the time of occurrence of the pulse;

a second register; second circuit means responsive to a pulse when produced by and to a second range of count states of the counting means for controlling the program means in response to the content of the second register, the program means when responding to the content of the second register causing the arithmetic means to carry out arithmetic operations as identified in numerical code by the content of the second register; and third circuit means operating subsequently to causing the program means to respond to the second register content, for replacing the content of the second register by the count state of the counting means from within said second range and as identified by the time of occurrence of the pulse.

14. In a desk calculator as in claim 13, the counting means halted upon occurrence of the pulse and restarted in response to a signal from the program means indicative that the count state of the counting means may be changed.

15. In a desk calculator as in claim 13, the restarting of the counting means being delayed for a period about equal to or longer than the expected key rebounce.

16. In a desk calculator as in claim 13, including means for inhibiting response of the first, second and third circuit means when pulses occur subsequent to occurrence of a pulse and maintaining said inhibiting through repeated occurrence of such pulses and for a particular time subsequent to a subsequent completion of a counting cycle without production of a pulse.

17. In a desk calculator having a first plurality of interrogation lines; a second plurality of sense lines disposed relative to the lines of the first plurality to establish a matrix, each line of the first plurality providing intersections with each line of the second plurality, further having switches disposed in the intersections to respectively interconnect the two lines in the respective intersection; the improvement comprising in combination;

first circuit means connected to the lines of the first plurality to sequentially and periodically introduce interrogation signals effective on all of the switches;

second circuit means connected to the lines of the second plurality and interrogating all of the lines of the second plurality to respond to an interrogation signal that is passed through a closed one of the switches and the line of the second plurality on the closed switch, and connected to the first circuit means to establish digital representation of identity of the closed switch;

third circuit means including a register for receiving from the second circuit means particular ones of the digital representation which represent particular commands further including additional means for interpreting other particular ones of the digital representatives as provided by the means as a figure entry;

fourth means connected to the register of the third means for providing arithmetic operations in response to a command entry as held in the register and when such command entry is received from the register;

fifth means for providing the content of the register to the fourth means for execution in response to a subsequent entry of another one of the particular commands, the particular commands including "adding", "subtracting" and "equal", whereby the "equal" command is entered to obtain execution of the respective previous command; and sixth means connected to the third circuit means for storing the digitized representation of a figure entry and further connected to the fourth means to provide the figures for the operations as defined by said particular commands and respectively when executed by the fourth means.

18. In a desk calculator having a first plurality of interrogation lines; a second plurality of sense lines disposed relative to the lines of the first plurality to establish a matrix, each line of the first plurality defining an intersection respectively with a line of the second plurality; further having switches disposed in the intersections to respectively interconnect the two lines in the respective intersection, the improvement comprising in combination;

scan counter means connected to the lines of the first plurality to introduce sequentially and periodically interrogate signals effective on all of the switches;

first circuit means connected to the lines of the second plurality and interrogating all of the lines of the second plurality to respond to an interrogation signal that is passed through a closed one of the switches and the line of the second plurality on the closed switch;

second circuit means connected to the scan counter means and to the first circuit means, to identify the closed switch as a particular count state of the counter means identified by the instant of response of the first circuit means;

third circuit means connected to be responsive when the particular count state falls within a first particular plurality of count state numbers of the counter means to interpret closing of the particular switch as a particular figure entry;

fourth circuit means connected to be responsive when the particular count state falls within a second particular plurality of count state numbers of the counter means to interpret closing of the particular switch as a command entry;

fifth circuit means including a stored program facility, and connected to receive the count state number as identifying a closed switch in response to the fourth circuit means to initiate execution of a command including the providing of one of a plurality of different arithmetic operations respectively identified by different particular ones of count state numbers of the first particular plurality; and sixth circuit means including the stored program facility and connected to receive the count state number as identifying a closed switch in response to the third circuit means to store representation or the like count state number as a figure to be subjected to an arithmetic operation by operation of the fifth circuit means.

19. In a calculator as in claim 18, the fourth means including holding digital representation of command, the fourth means further including transmission means for transferring the content of the register to the fifth means when a count state within the second particular plurality is detected in the fourth means, and loading the latter count state as replacement into the register, for transfer to the transmission means in response to a subsequent command entry.

* * * * *